United States Patent [19]
Wakabayashi et al.

[11] Patent Number: 5,642,374
[45] Date of Patent: Jun. 24, 1997

[54] EXCIMER LASER DEVICE

[75] Inventors: Osamu Wakabayashi; Hakaru Mizoguchi, both of Hiratsuka, Japan

[73] Assignee: Kabushiki Kaisha Komatsu Seisakusho, Tokyo, Japan

[21] Appl. No.: 420,132

[22] Filed: Apr. 10, 1995

[30]     Foreign Application Priority Data

Apr. 12, 1994  [JP]  Japan .................................. 6-073389
Oct. 20, 1994  [JP]  Japan .................................. 6-255478

[51] Int. Cl.⁶ .............................. H01S 3/22; H01S 3/223
[52] U.S. Cl. .................................... 372/57; 372/58
[58] Field of Search ........................ 372/57, 58, 38

[56]            References Cited

U.S. PATENT DOCUMENTS

| 4,958,356 | 9/1990 | Tanuma .................................. 372/57 |
| 5,142,543 | 8/1992 | Wakabayashi et al. ................ 372/57 |
| 5,440,578 | 8/1995 | Sandstrom .............................. 372/57 |
| 5,450,436 | 9/1995 | Mizoguchi et al. ................... 372/57 |

*Primary Examiner*—Rodney B. Bovernick
*Assistant Examiner*—Robert E. Wise
*Attorney, Agent, or Firm*—Varndell Legal Group

[57]            ABSTRACT

Aimed at preventing a laser light beam profile from fluctuating, and by using the fact that there is a substantially proportional relation between the beam profile and the charging voltage as well as between the beam profile and the composition or the total pressure of the laser gases, an excimer laser device comprises a laser chamber containing laser gases which are excited by initiating an electric discharge in the laser chamber to output laser light, a beam profile detector for detecting a beam profile of the output laser light, and a controller for controlling a electric discharge voltage (excitation intensity) and composition or total pressure of the prescribed types of laser gases in such a way that the beam profile is shaped as desired based on detection results of the beam profile detector. An excimer laser feedback control circuit detects the output laser beam width and controls the beam width by controlling one or more of the laser voltage, composition of the laser gas, pressure or partial pressure of the laser gas, or feed rate of a laser gas. The laser gas may comprise a halogen, buffer, or rare gas.

19 Claims, 22 Drawing Sheets

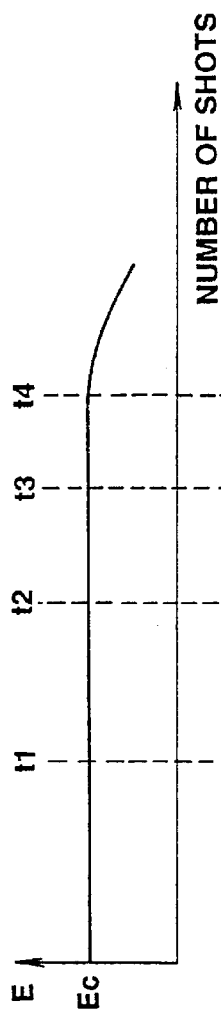
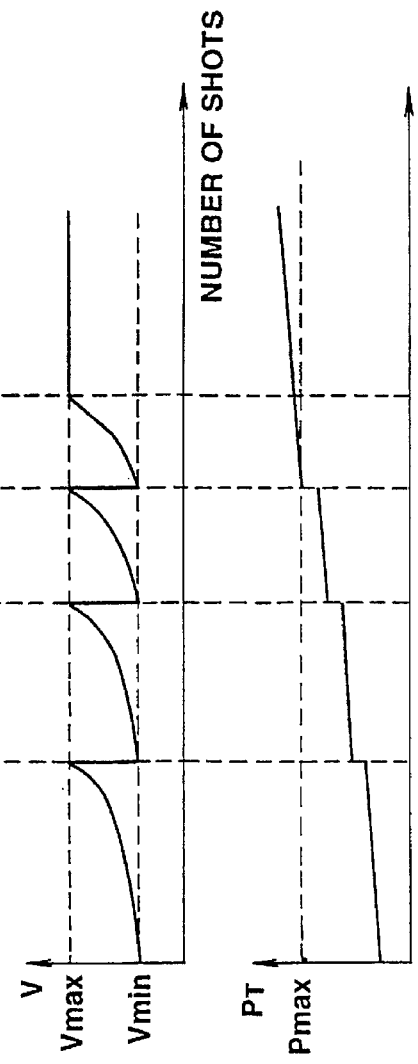
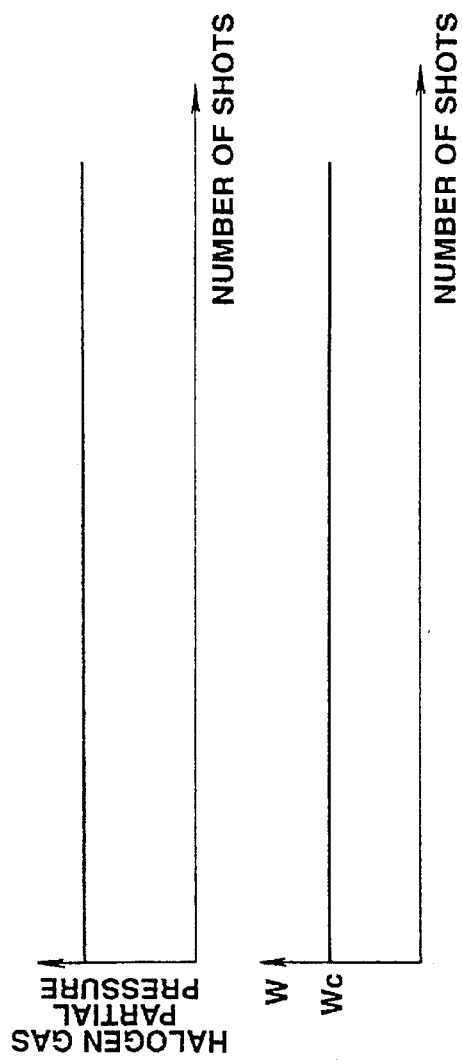
FIG.16a
FIG.16b
FIG.16c
FIG.16d
FIG.16e

EXCIMER LASER DEVICE

BACKGROUND OF THE INVENTION

1. Field of the Invention

This invention relates to an excimer laser device designed to be used as a light source for reduction projection aligners, for the fine working of materials, for the surface modification of materials, and the like, and in particular to an improvement aimed at stabilizing the beam profile of output laser light.

2. Description of Related Art

When an excimer laser device is conventionally operated using a halogen gas, the gas is consumed during the operation due to the evaporation of the electrode materials and to the chemical reactions involving the structural materials of the laser chamber. The following control measure was therefore adopted in the past to compensate for the reduction in laser output due to the loss of the halogen gas.

Specifically, laser output is obtained by feeding electric energy,. which is accumulated in a capacitor in order to excite the laser, to a discharge space and initiating an electric discharge in a laser medium gas. The laser output (power) is increased, however, when the charging voltage of this capacitor is raised. In the past, therefore, the laser output was stabilized by detecting the output and controlling the value of the charging voltage in accordance with the detection results. This type of control is called "powerlock control" ("POWERLOK" is a registered trademark of Questek, U.S.A.).

Even with this type of control, however, the oscillation efficiency is reduced due to the loss of the halogen gas when the operation is conducted for a long time, and it becomes impossible to maintain the prescribed output unless the charging voltage is gradually increased.

In view of the above, the aforementioned loss of the halogen gas was dealt with in the past by replenishing a constant amount of the halogen gas when the charging voltage rose above a certain prescribed voltage.

This conventional technique is described, for example, in the Official Gazette of Published Unexamined Patent Application of Japan (Japanese Laid-Open Patent Application 3-135089). A technique related to this prior art is also described in U.S. Pat. No. 4,977,573.

The following is a description of an embodiment which, although different from the embodiments described in the aforementioned Official Gazette, is technologically similar and is preferable for implementation. FIG. 23 and FIGS. 24a through 24e are drawings illustrating a preferred embodiment of a method for replenishing the halogen gas.

Specifically, FIG. 23 illustrates the structural components related to gas replenishment for a common discharge-excited excimer laser device, in which case the cylinders used for gas injection comprise a cylinder 1 filled with a halogen gas ($F_2$, HCl, or the like), a cylinder 2 filled with krypton or other such rare gas, and a cylinder 3 filled with neon, helium, or other such buffer gas.

Laser light that is output by a laser chamber 4 passes through a beam splitter 5, a portion of the light strikes an output detector 6, and the output value E thereof is detected by the output detector 6. The detected output value E is input to a controller 7.

Meanwhile, the pressure (total pressure) PT of the laser gases inside the laser chamber 4 is detected by a pressure sensor 8, and the detected value PT is also input to the controller 7.

The controller 7 controls the charging voltage V of an electric discharge power source 9 on the basis of these detected values E and PT, and also controls a gas supply and exhaust device 10, thus effecting the supply and exhaust control of the laser gases.

The specifics of this case are as follows: gases are fed, for example, in a halogen gas:rare gas:buffer gas ratio of 4:40:2456 (torr), and the target laser output $E_c$, optimum control charging voltage range $V_m$ ($V_{min}$ to $V_{max}$), and the like are established.

When the operation is started, the controller 7 receives the laser voltage E detected by the output detector 6, the laser voltage E is compared with the target laser output $E_c$, and control is effected in the following manner: when $E<E_c$, the charging voltage V is changed by a microscopic voltage $\Delta V$; when $E=E_c$, the charging voltage V is left unchanged; and when $E>E_c$, the charging voltage V is lowered by the microscopic voltage $\Delta V$.

In addition, the controller 7 compares the charging voltage V with the maximum value $V_{max}$ of the charging voltage and controls the operation in such a way that when $V>V_{max}$, a prescribed amount of the halogen gas is supplied into the laser chamber 4 from the halogen gas cylinder 1.

FIGS. 24a through 24e are time charts related to the aforementioned control procedures. FIGS. 24a, 24b, 24c, 24d, and 24e illustrate the laser voltage E, charging voltage V, halogen gas partial pressure, rare gas partial pressure, and beam width, respectively. Specifically, when the charging voltage V does not exceed $V_{max}$, the charging voltage V is changed (raised in this case) in order to make the laser voltage E constant, and because the charging voltage V reaches the maximum allowable level $V_{max}$ at times $t_1$, $t_2$, . . . , $t_6$, the halogen gas is injected at each of these times.

Because such control procedures do not involve gas exhaust during the injection of the halogen gas, the partial pressure of the rare gas krypton is kept constant, but an oversupply of the halogen gas gradually builds up as the number of replenishment cycles is increased, ultimately disrupting the gas balance. Specifically, every time the halogen gas is replenished in accordance with the aforementioned conventional technique, the optimum compositional balance of the mixed gases in the laser chamber becomes more disrupted, making it impossible to keep the laser output constant despite repeated attempts to control the charging voltage impressed on the capacitor.

It should be noted that the aforementioned conventional technique, which involves controlling only the laser output to keep it constant, can successfully control the laser output and keep it constant, but does not control the beam profile in any way, and is thus disadvantageous because of the wide fluctuations of the beam profile. A specific example of a beam profile is the beam width in a direction perpendicular to the discharge direction of an output laser; FIG. 24e illustrates the manner in which the beam width W changes over time. As can be seen in this figure, the beam width W undergoes substantial changes in the same manner as does the partial pressure of the halogen gas.

These changes in the beam profile alter the energy density of the laser light illuminating the surface being exposed or processed, resulting in poor exposure quality or processing quality. The electrode shape, operating discharge voltage, gas composition, gas pressure, and the like are factors that change the beam profile.

SUMMARY OF THE INVENTION

In view of the aforementioned situations, an object of this invention is to provide an excimer laser device capable of preventing the fluctuations in the beam profile due to fluctuations in the excitation intensity (charging voltage), gas composition, and the like in a reliable and accurate manner.

In this connection, fluctuations in the power of output laser light are triggered when the gas composition is changed in order to prevent the fluctuation in the beam profile.

Therefore, another object of the present invention is to provide an excimer laser device capable Of preventing the fluctuations in the power of output laser light.

To achieve these and other objects, this invention provides an excimer laser device comprising a laser chamber containing a laser gas which is excited by initiating an electric discharge in the laser chamber to output laser light, beam profile detection means for detecting a beam profile of the output laser light, and discharge voltage control means for controlling a voltage of the electric discharge in such a way that the beam profile is shaped as desired based on detection results of the beam profile detection means.

With this construction, the charging voltage is in a substantially proportional relation with the beam profile, making it possible to control the beam profile to the desired shape by controlling the charging voltage on the basis of this relation.

Further, this invention provides an excimer laser device comprising a laser chamber containing prescribed types of laser gases, which are excited by initiating an electric discharge in the laser chamber to output laser light, beam profile detection means for detecting a beam profile of the output laser light, and gas control means for controlling composition or total pressure of the prescribed types of laser gases in such a way that the beam profile is shaped as desired based on detection results of the beam profile detection means.

With this construction, there is a substantially proportional relation between the beam profile and the composition or the total pressure of the laser gases, so the beam profile can be controlled to the desired shape by adjusting the gas replenishment amount or the like on the basis of this relation.

Furthermore, this invention provides an excimer laser device comprising a laser chamber containing prescribed types of laser gases, which are excited by initiating an electric discharge in the laser chamber to output laser light, beam profile detection means for detecting a beam profile of the output laser light, and control means for controlling a voltage of the electric discharge and composition or total pressure of the prescribed types of laser gases in such a way that the beam profile is shaped as desired based on detection results of the beam profile detection means.

With this construction, there is a substantially proportional relation between the beam profile and the charging voltage, as well as between the beam profile and the composition or the total pressure of the laser gases, so the beam profile can be controlled to the desired shape by controlling the charging voltage or by adjusting the gas replenishment amount or the like on the basis of this relation.

Still further, this invention provides an excimer laser device comprising a laser chamber containing laser gases including a halogen gas which are excited by initiating an electric discharge in the laser chamber to output laser light, beam profile detection means for detecting a beam profile of the output laser light, and halogen gas supply means for controlling feed rate of the halogen gas in such a way that the beam profile is shaped as desired based on detection results of the beam profile detection means.

With this construction, there is a substantially proportional relation between the beam profile and the halogen gas partial pressure, so the beam profile can be controlled to the desired shape by controlling the feed rate of the halogen gas on the basis of this relation.

Moreover, this invention provides an excimer laser device comprising a laser chamber containing laser gases including a rare gas, which are excited by initiating an electric discharge in the laser chamber to output laser light, beam profile detection means for detecting a beam profile of the output laser light, and rare gas supply means for controlling feed rate of the rare gas in such a way that the beam profile is shaped as desired based on detection results of the beam profile detection means.

With this construction, there is a substantially proportional relation between the beam profile and the rare gas partial pressure, so the beam profile can be controlled to the desired shape by controlling the feed rate of the rare gas on the basis of this relation.

Furthermore, this invention provides an excimer laser device comprising a laser chamber containing prescribed types of laser gases which are excited by initiating an electric discharge in the laser chamber to output laser light, power detection means for detecting power of the output laser light, beam profile detection means for detecting a beam profile of the output laser light, discharge voltage control means for controlling a voltage of the electric discharge in such a way that the output laser power is kept at a desired level on the bases of detection results of the power detection means, and gas control means for controlling composition or total pressure of the prescribed types of laser gases in such a way that the beam profile is shaped as desired based on detection results of the beam profile detection means.

With this construction, the output laser power fluctuates when the composition or the total pressure of the laser gases is changed in order to prevent the beam profile from fluctuating. Such fluctuations of the output laser power are suppressed, however, by controlling the charging voltage.

This invention thus allows the beam profile of laser light to be kept constant or to be shaped as desired, making it possible to stabilize the energy density of laser light, to improve uniformity, and to improve the quality of exposure or processing.

BRIEF DESCRIPTION OF THE DRAWINGS

FIGS. 2a and 2b are diagrams illustrating the configurational relationship between the beam profile detector and the laser chamber in which FIG. 2a is a plan view, and FIG. 2b is a front view;

FIGS. 14a, 14b, 14c, and 14d are time charts illustrating how various signals change over time as a result of control performed in accordance with the first embodiment in which FIGS. 14a, 14b, 14c, and 14d are time charts illustrating the changes in laser output, charging voltage, halogen gas partial pressure, and beam width, respectively;

FIG. 16 is time charts illustrating how various signals change over time as a result of control performed in accordance with the second embodiment in which FIGS. 16a, 16b, 16c, 16d, and 16e are time charts illustrating the changes in laser output, charging voltage, total gas pressure, halogen gas partial pressure, and beam width, respectively;

FIG. 24 is time charts illustrating how various signals change over time in accordance with prior art in which

DETAILED DESCRIPTION OF THE PREFERRED EMBODIMENTS

This invention will now be described in detail in accordance with the embodiments by referring to the accompanying drawings.

Figure 1:
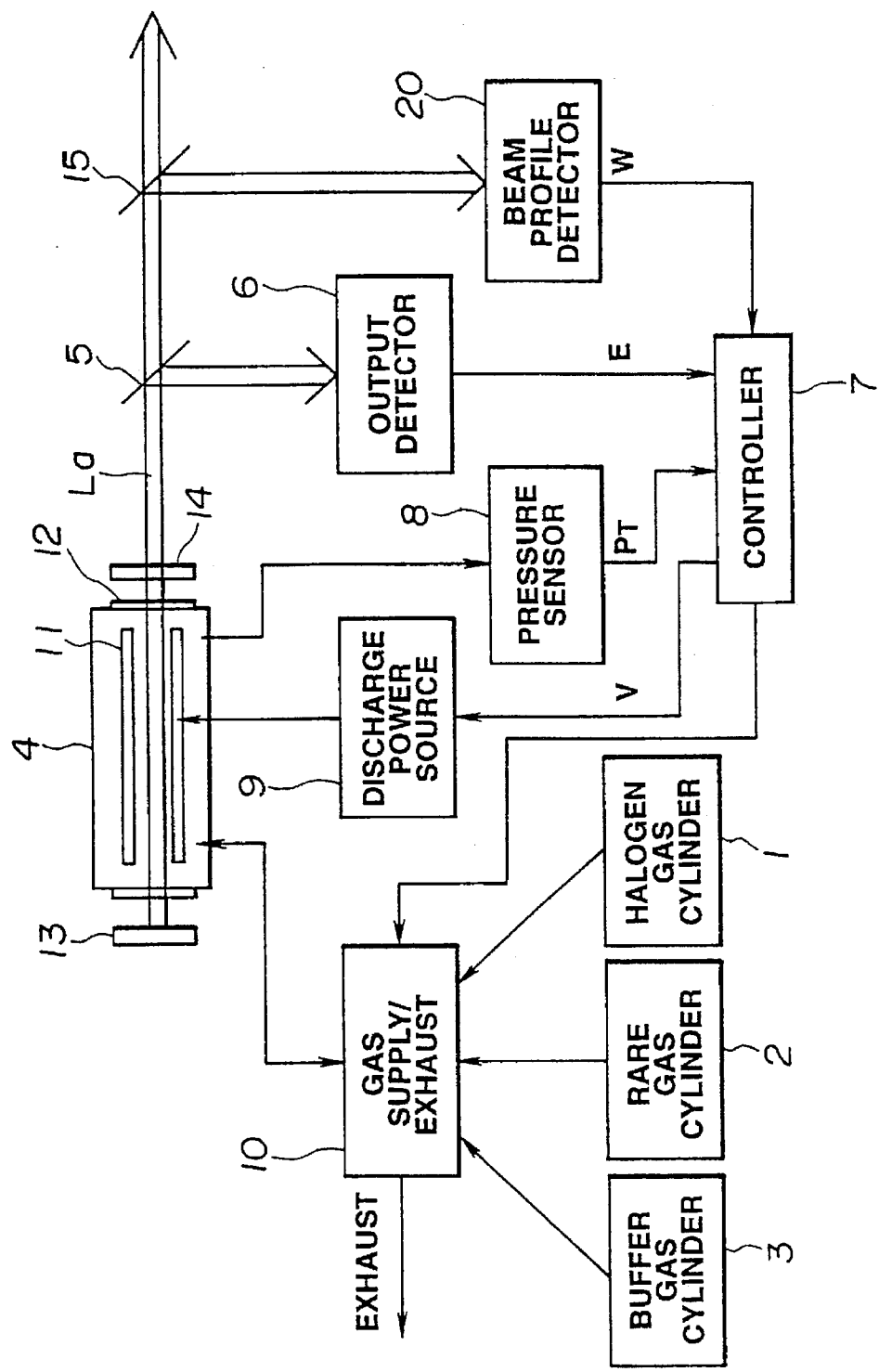
FIG. 1 is a block diagram illustrating the system configuration of an embodiment of this invention.
Figure 23:
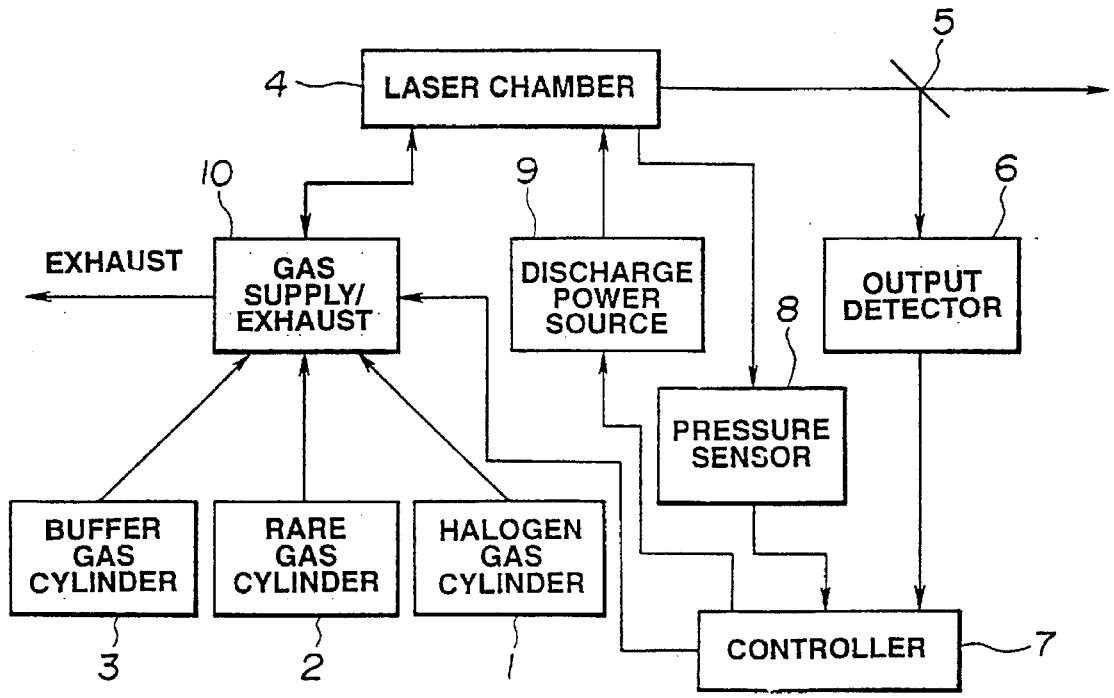
FIG. 23 is a diagram illustrating the system configuration of prior art.
Figure 24A:
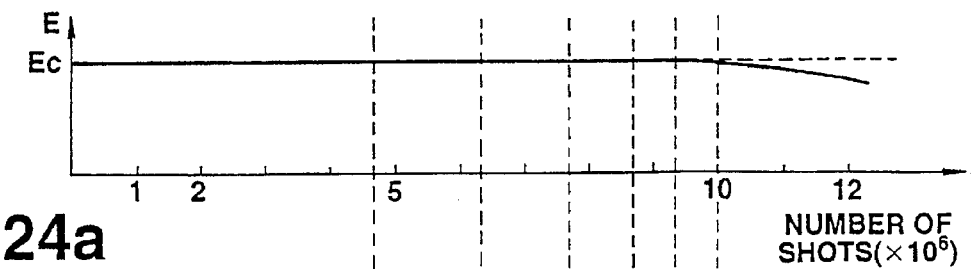
FIGS. 24a, 24b, 24c, 24d, and 24e are time charts illustrating the changes in laser output, charging voltage, $F_2$ gas partial pressure, krypton partial pressure, and beam width, respectively.
Figure 24B:
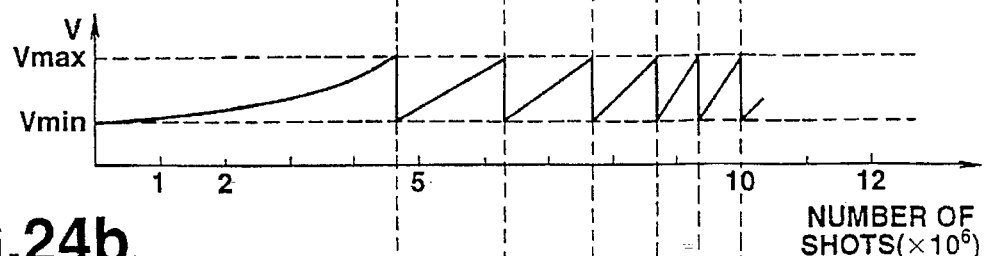
Figure 24C:
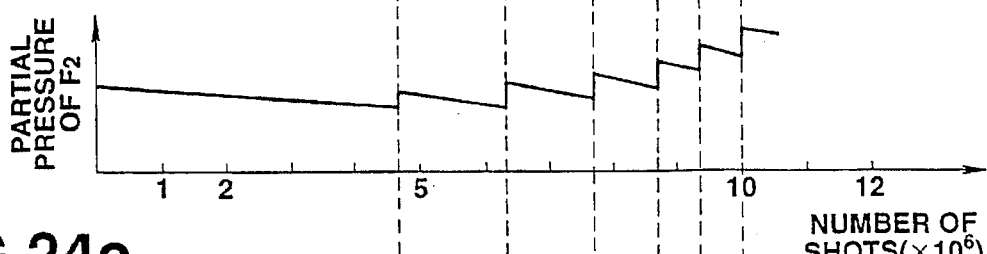
Figure 24D:
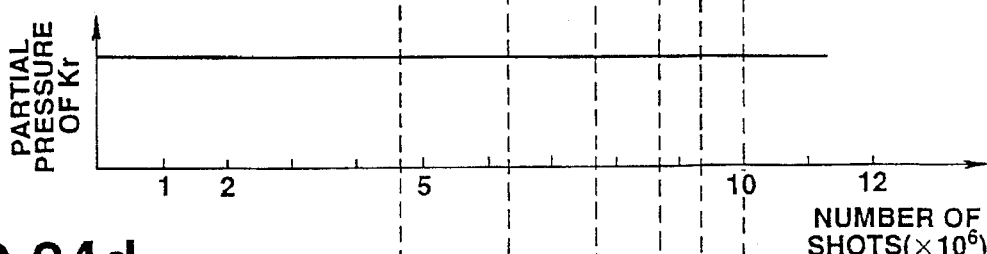
Figure 24E:
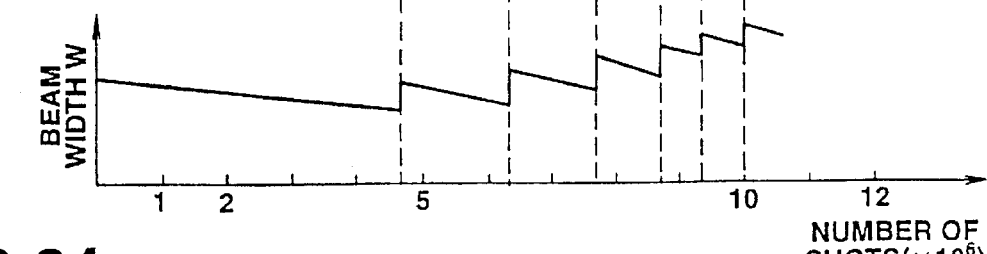

FIG. 1 illustrates an embodiment of this invention in which identical symbols are used for the same structural elements as those used in the above-described conventional device shown in FIG. 23. The embodiment of FIG. 1 is obtained by adding a beam splitter 15 and beam profile detector 20 to the conventional device shown in FIG. 23.

In FIG. 1, a laser chamber 4 is filled with laser gases, that is, with a halogen gas ($F_2$, HCl, or the like), a rare gas (krypton, xenon, or the like), and a buffer gas (neon, helium, or the like). A discharge power source 9 stores electric energy in a charging capacitor (not shown), and the laser gases are discharge-excited by feeding the stored electric energy to the discharge space via a discharge electrode 11. Laser oscillations are initiated as a result of the fact that a resonator consisting of a front mirror 14 and rear mirror 13 forces the light generated by the electric discharge to resonate. The laser light is output via a window 12 and the front mirror 14.

A portion of the output laser light is sampled by a beam splitter 5 and a beam splitter 15, and the sampled light is fed to an output (power) detector 6 and a beam profile detector 20.

The output detector 6 detects the laser output (power) E and feeds the detected output E to a controller 7.

The beam profile detector 20 detects the beam profile in the form of, for example, a beam width W in a direction perpendicular to the discharge direction, and feeds the detection output to the controller 7. The specifics of the beam profile detector 20 will be described below.

A halogen gas cylinder 1 is filled with $F_2$, HCl, or other such halogen gas; a rare gas cylinder 2 is filled with krypton, xenon, or other such rare gas; and a buffer gas cylinder 3 is filled with neon, helium, or other such buffer gas. A gas supply and exhaust device 10 feeds the gases contained in the cylinders to the laser chamber 4 and controls the exhaust of the gases from the laser chamber 4 in accordance with the instructions from the controller 7. The halogen gas cylinder 4 is usually diluted with a buffer gas.

A pressure sensor 8 detects the gas pressure PT inside the laser chamber 4 and inputs the detection output PT to the controller 7.

The controller 7 controls the charging voltage V of the discharge power source 9 and controls the supply and exhaust of gases to and from the laser chamber 4 on the basis of the laser output E detected by the output detector 6, the beam width W detected by the beam profile detector 20, and the gas pressure PT detected by the pressure sensor 8.

Figure 2A:
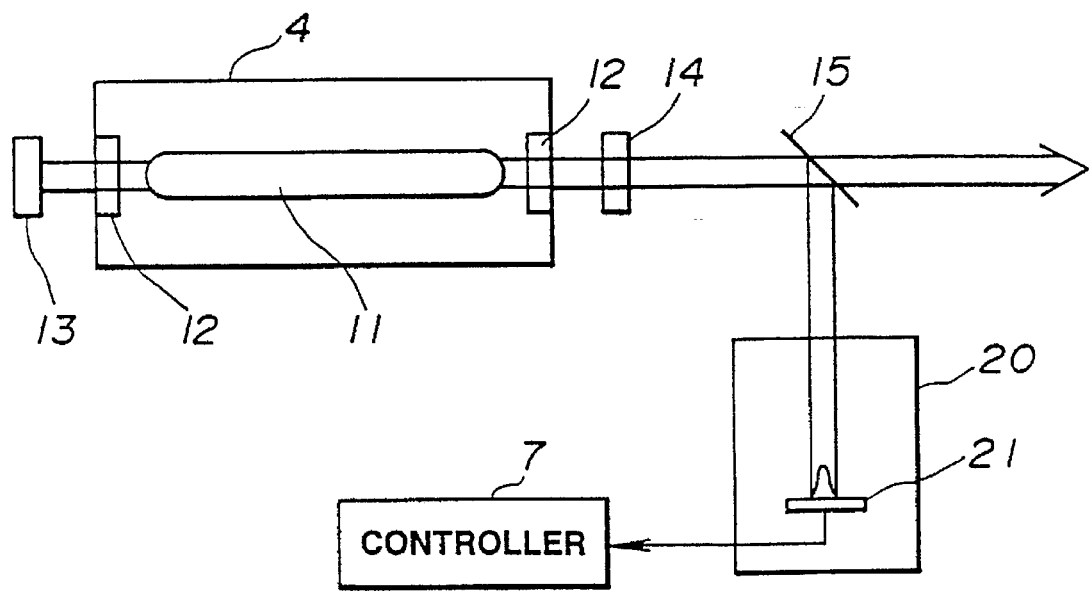
Figure 2B:
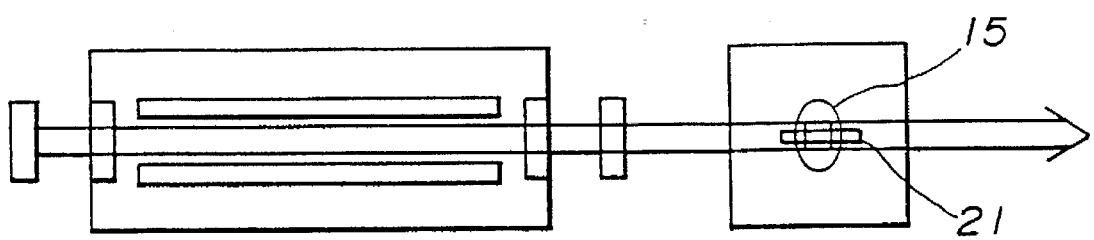

Referring to FIGS. 2a and 2b, the beam profile detector 20 includes a line sensor 21. The line sensor 21 is oriented (in a direction lying in the plane of the drawing depicting the plan view (FIG. 2a)) in such a way that it can detect the beam width W in a direction perpendicular to the discharge direction (direction perpendicular to the plane of FIG. 2a), and inputs its light-reception output to the controller 7. The value that corresponds to the beam width W may be a full width at half maximum or 1/e2 width.

Figure 3A:
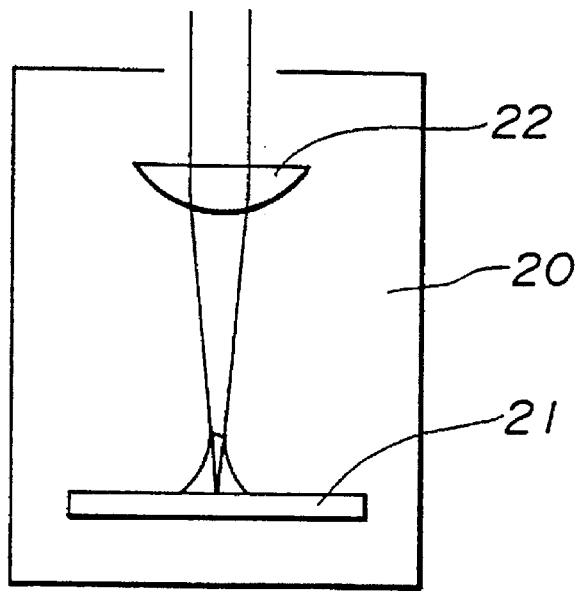
FIGS. 3a and 3b are diagrams illustrating configurational examples of the beam profile detector.
Figure 3B:
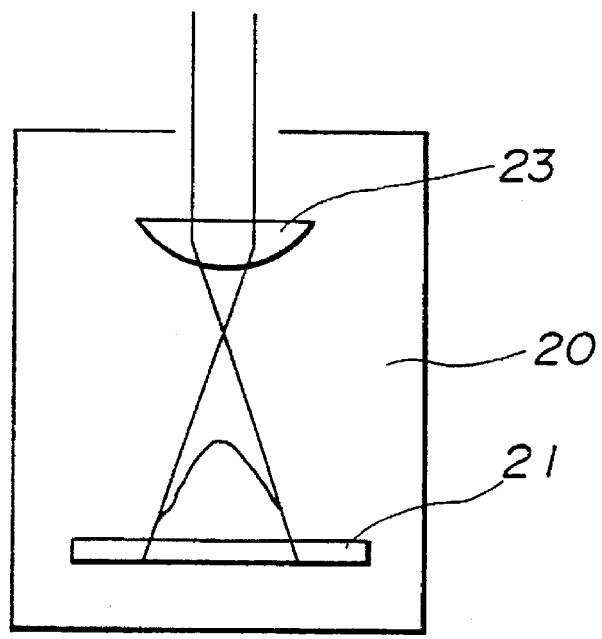

FIGS. 3a and 3b illustrate examples of the beam profile detector 20. In FIG. 3a, laser light is gathered by a condenser 22 and directed to the line sensor 21. It is also possible to install a concave lens or a convex mirror instead of the condenser 22 to detect laser light with a wide beam.

In FIG. 3b, laser light is transferred onto the line sensor 21 by a transfer lens 23.

According to the experiments performed by the inventors, the beam width W detected by the beam profile detector 20, while displaying a marked dependence on the halogen gas partial pressure, charging voltage (excitation intensity), and buffer gas partial pressure, does not depend very much on the laser gas total pressure PT.

Figure 4:
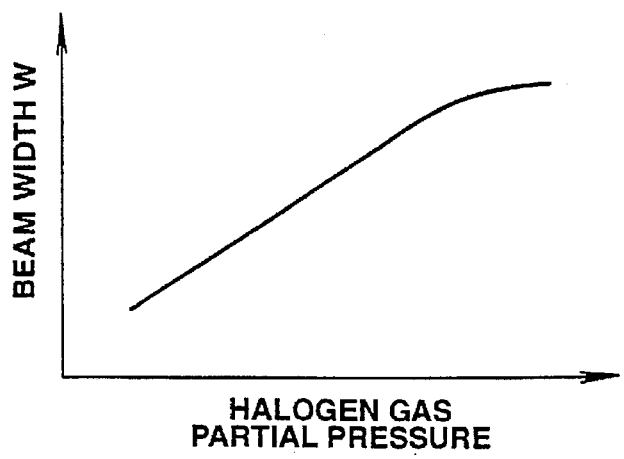
FIG. 4 is a diagram illustrating the relation between the halogen gas partial pressure and the beam width.
Figure 5:
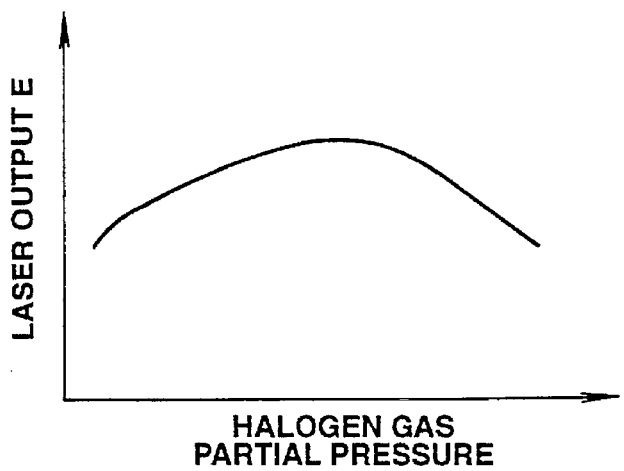
FIG. 5 is a diagram illustrating the relation between the halogen gas partial pressure and the laser output.
Figure 6:
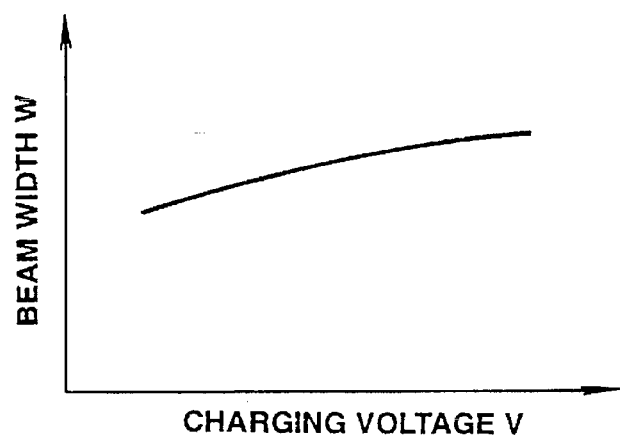
FIG. 6 is a diagram illustrating the relation between the charging voltage and the beam width.
Figure 7:
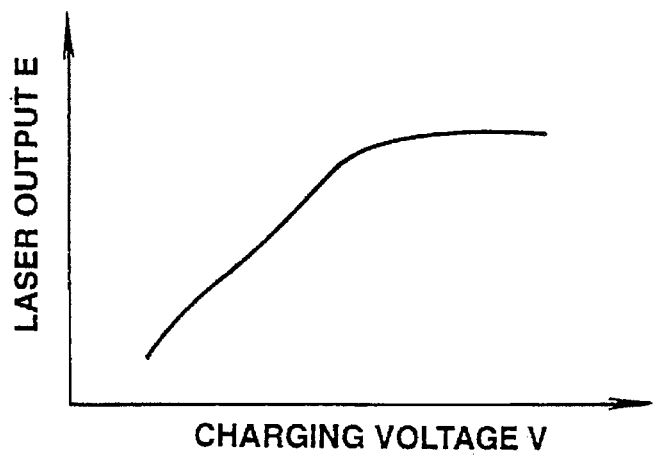
FIG. 7 is a diagram illustrating the relation between the charging voltage and the laser output.
Figure 8:
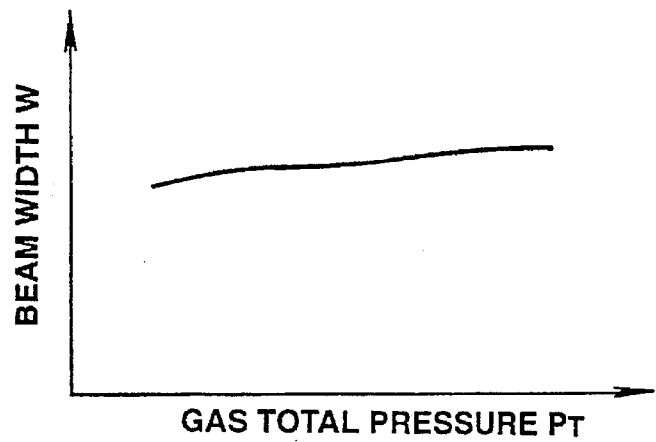
FIG. 8 is a diagram illustrating the relation between the total gas pressure and the beam width.
Figure 9:
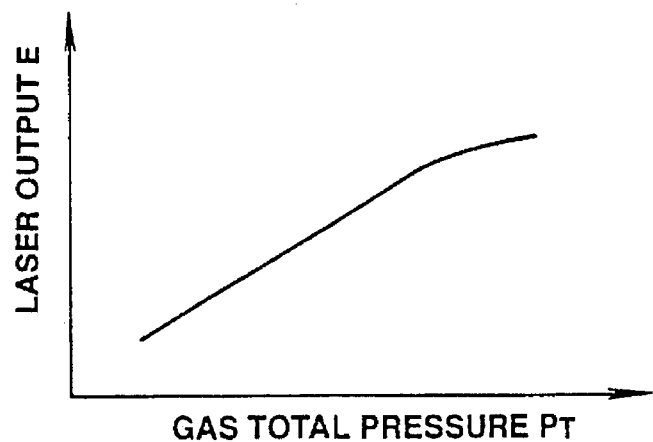
FIG. 9 is a diagram illustrating the relation between the total gas pressure and the laser output.
Figure 10:
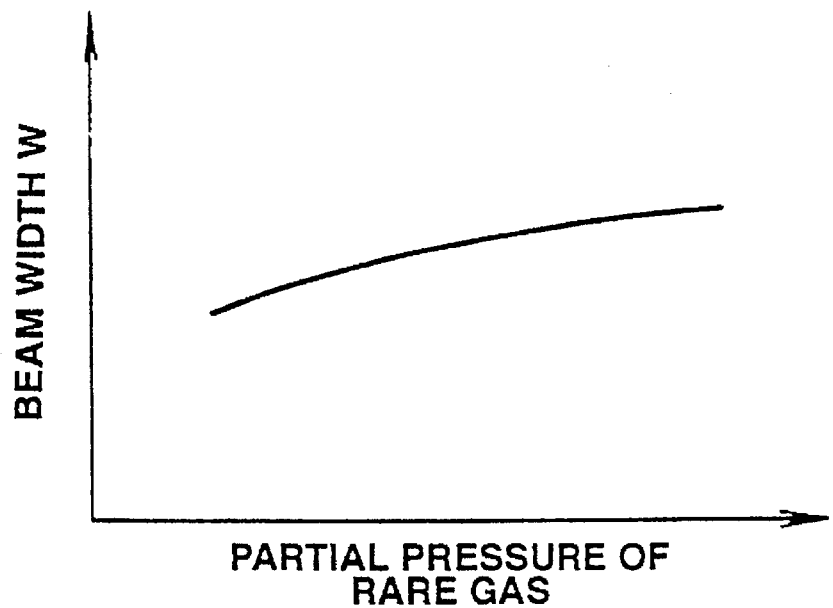
FIG. 10 is a diagram illustrating the relation between the rare gas partial pressure and the beam width.
Figure 11:
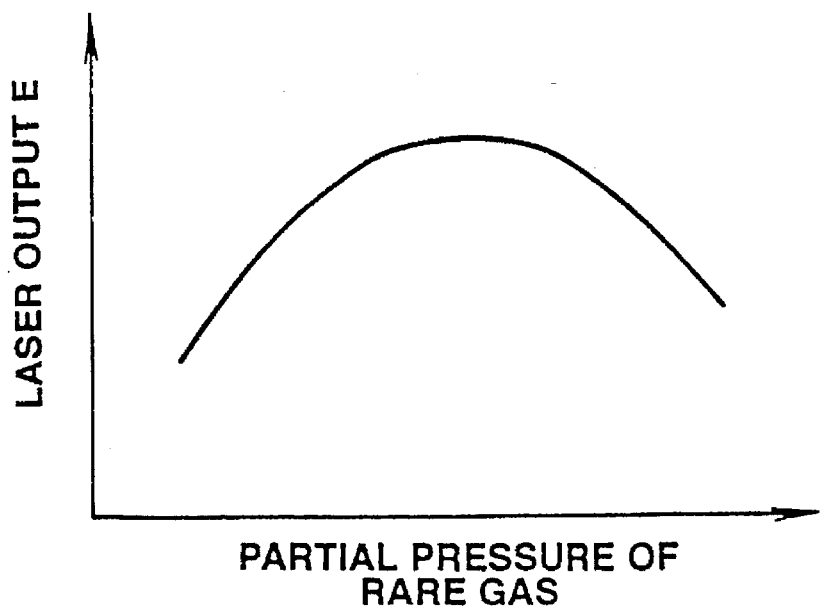
FIG. 11 is a diagram illustrating the relation between the rare gas partial pressure and the laser output.

FIG. 4 illustrates the relation between the halogen gas partial pressure and the beam width W, FIG. 5 illustrates the relation between the halogen gas partial pressure and the laser output E, FIG. 6 illustrates the relation between the charging voltage V and the beam width W, FIG. 7 illustrates the relation between the charging voltage V and the laser output E, FIG. 8 illustrates the relation between the total gas pressure PT and the beam width W, FIG. 9 illustrates the relation between the total gas pressure PT and the laser output E, FIG. 10 illustrates the relation between the rare gas partial pressure and the beam width W, and FIG. 11 illustrates the relation between the rare gas partial pressure and the laser output E.

According to these figures, the halogen gas partial pressure and the beam width W in particular are in a substantially proportional relation with a relatively steep slope (see FIG. 4), making it possible to control the beam width by adjusting the amount or rate of halogen gas replenishment on the basis of this relation.

In addition, according to FIGS. 6 and 10, the charging voltage V or rare gas partial pressure is also in a substantially proportional relation with the beam width (although their slopes are not as steep as those for the relation between the halogen gas partial pressure and beam width), making it possible to control the beam width W by adjusting the charging voltage V or rare gas partial pressure.

Figure 12:
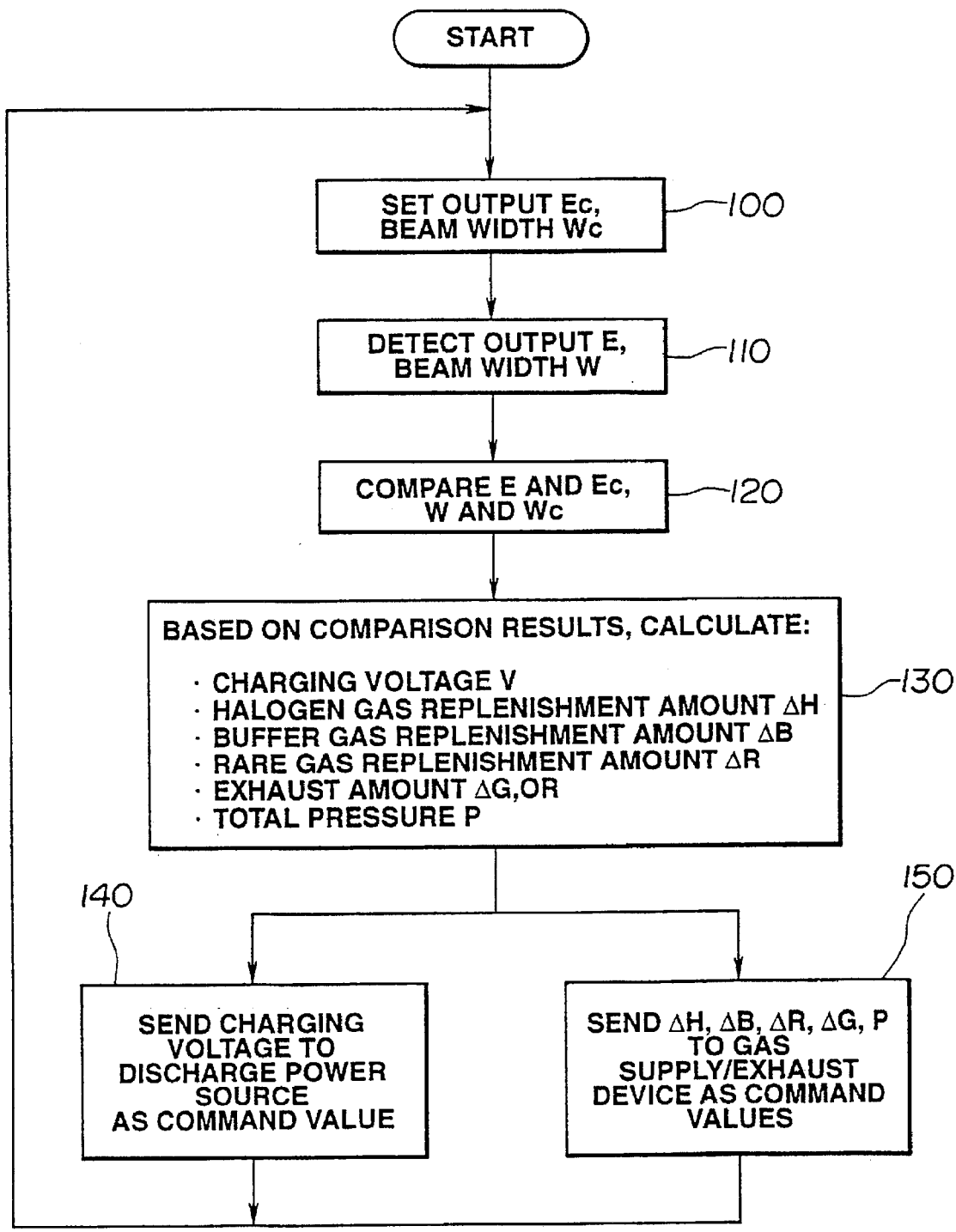
FIG. 12 is a flow chart schematically illustrating how a controller controls the charging voltage and the supply and exhaust of gases.

The manner in which the controller 7 controls the charging voltage and the supply and exhaust of gases will now be described in accordance with the flow chart of FIG. 12.

An operator first sets the rated laser output $E_c$ and beam width target value $W_c$ to the desired levels (step 100).

Next, the laser is oscillated, the laser output E is then detected by the output detector 6, and the beam width W is detected by the beam profile detector 20 (step 110).

The detected laser output E is compared with the rated laser output $E_c$, and the detected beam width W is compared with the target value $W_c$ (step 120).

The charging voltage V, halogen gas replenishment amount ΔH, buffer gas replenishment amount ΔAB, rare gas replenishment amount ΔR, exhaust amount ΔG, or total pressure PT is subsequently calculated in accordance with the comparison results; the calculated value of V is sent to the discharge power source, and the charging voltage V is controlled. The calculated value of ΔH, ΔB, ΔR, ΔG, or PT is sent to the gas supply and exhaust device 10 to control the supply and exhaust of gases (steps 130 through 150).

These control procedures are repeatedly implemented.

First Embodiment

The first embodiment will now be described with reference to FIG. 13, which illustrates the details of the calculation subroutine performed during steps 120 and 130.

Figure 13:
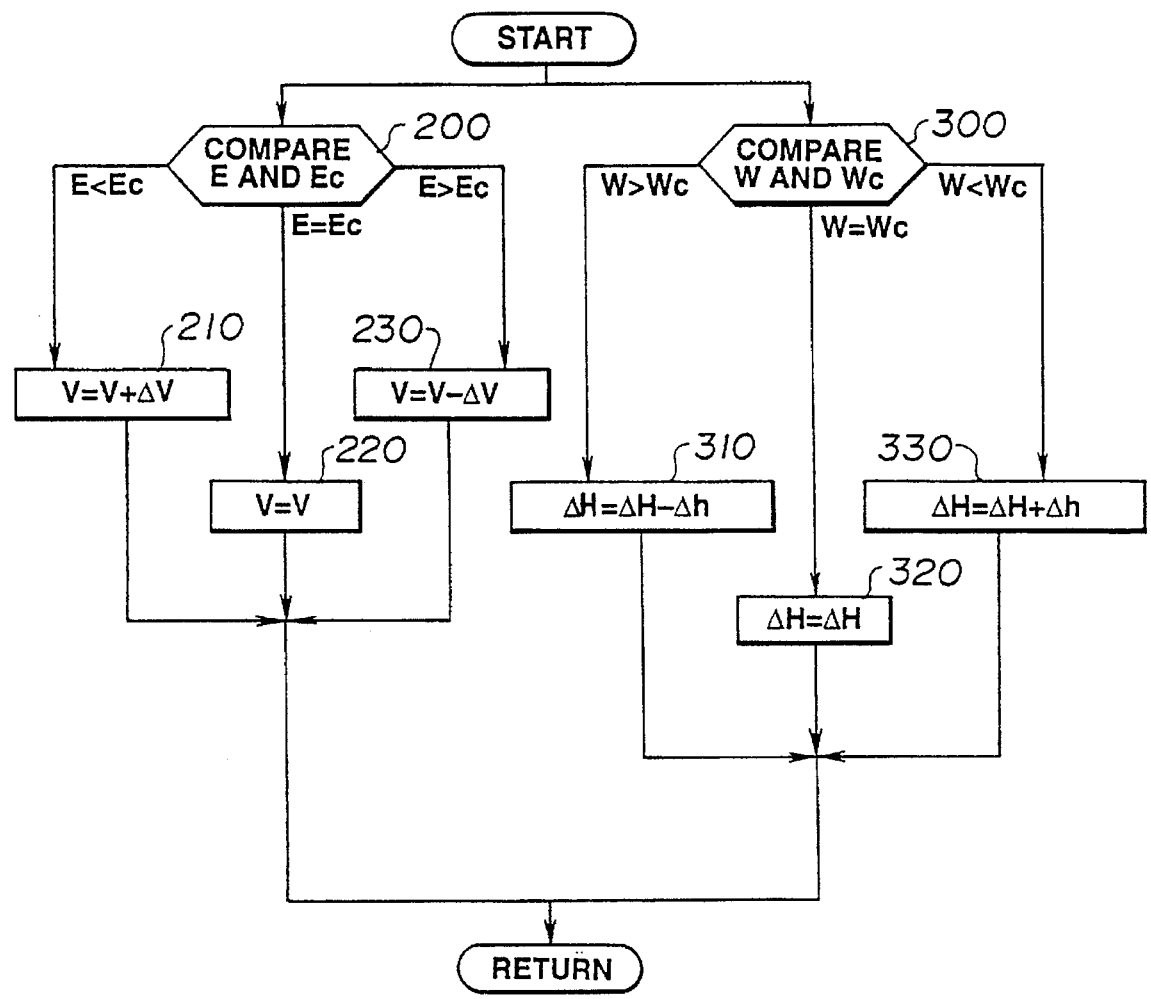
FIG. 13 is a flow chart illustrating a first embodiment of controlling the charging voltage and the supply and exhaust of gases.

In FIG. 13, the processing of steps 200 through 230 and the processing of steps 300 to 330 are performed in parallel.

During step 200, the laser output E and the rated laser output $E_c$ are compared with each other, and the charging voltage V is raised by ΔV (step 210) if the result of this comparison is E<$E_c$, the charging voltage V is lowered by ΔV (step 230) if E>$E_c$, and the current charging voltage V is maintained (step 220) if E=$E_c$. ΔV may be a constant amount, or it may be an amount set in accordance with the difference between E and $E_c$.

Meanwhile, during step 300, the beam width W is compared with the target value $W_c$, and the halogen gas replenishment amount ΔH is lowered by Δh (step 310) if the result of this comparison is W>$W_c$, the halogen gas replenishment amount ΔH is raised by ΔH (step 330) if W<$W_c$, and the current halogen gas replenishment amount ΔH is maintained (step 320) if W=$W_c$. The ΔH value may be constant, or it may be set in accordance with the difference between W and $W_c$. The halogen gas replenishment amount was controlled in the above case, but the replenishment flow rate may also be controlled when the halogen gas is replenished continuously.

FIGS. 14a through 14d illustrate the time charts of the various quantities of state involved in the control operations.

Figure 14A:
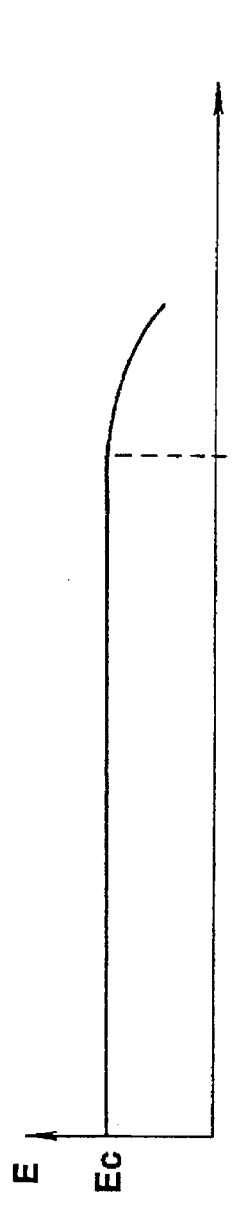
Figure 14B:
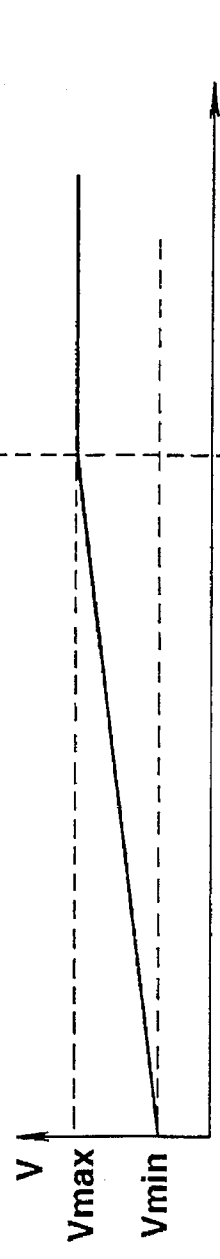
Figure 14C:
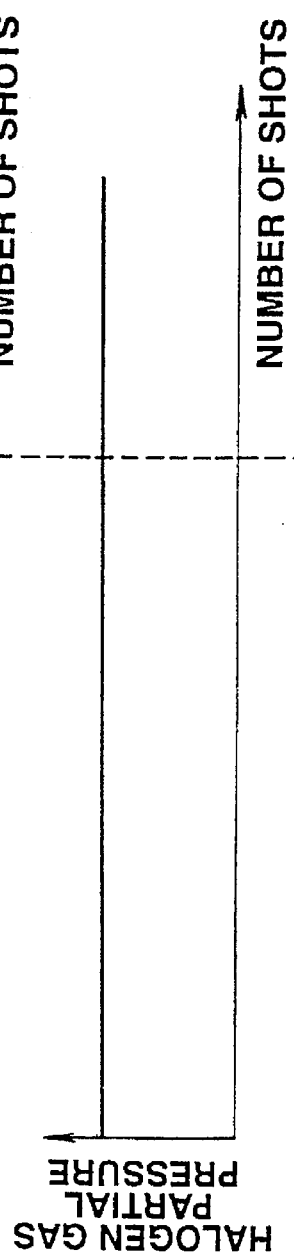
Figure 14D:
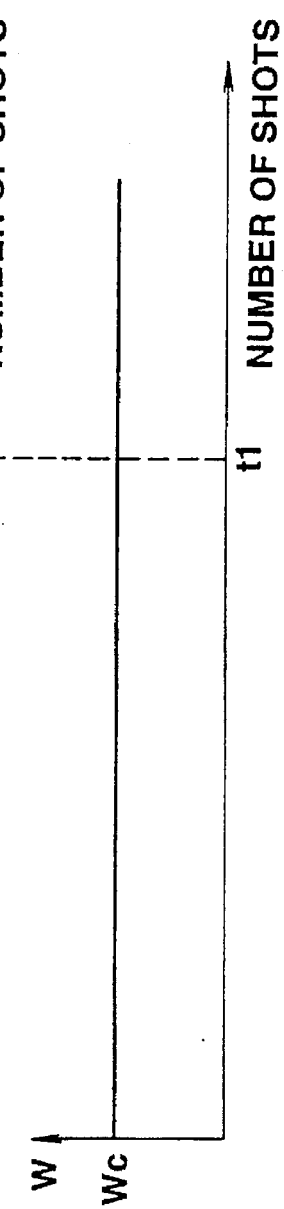

According to these figures, the charging voltage V is gradually raised by fixedly controlling the laser output. When the charging voltage V reaches the maximum allowable level $V_{max}$ (at time $t_1$ and thereafter), it is impossible to raise charging voltage V any further, so the laser output E gradually decreases. In addition, the beam width is always constant because the processing involved in steps 300 through 330 controls the halogen replenishment amount so that the beam width W reaches the target value $W_c$. As is also shown in FIGS. 14c and 14d, there is a proportional relation between the halogen partial pressure and the beam width, so the partial pressure of the halogen gas always remains constant in response to the fixedly controlled beam width.

Second Embodiment

Figure 15:
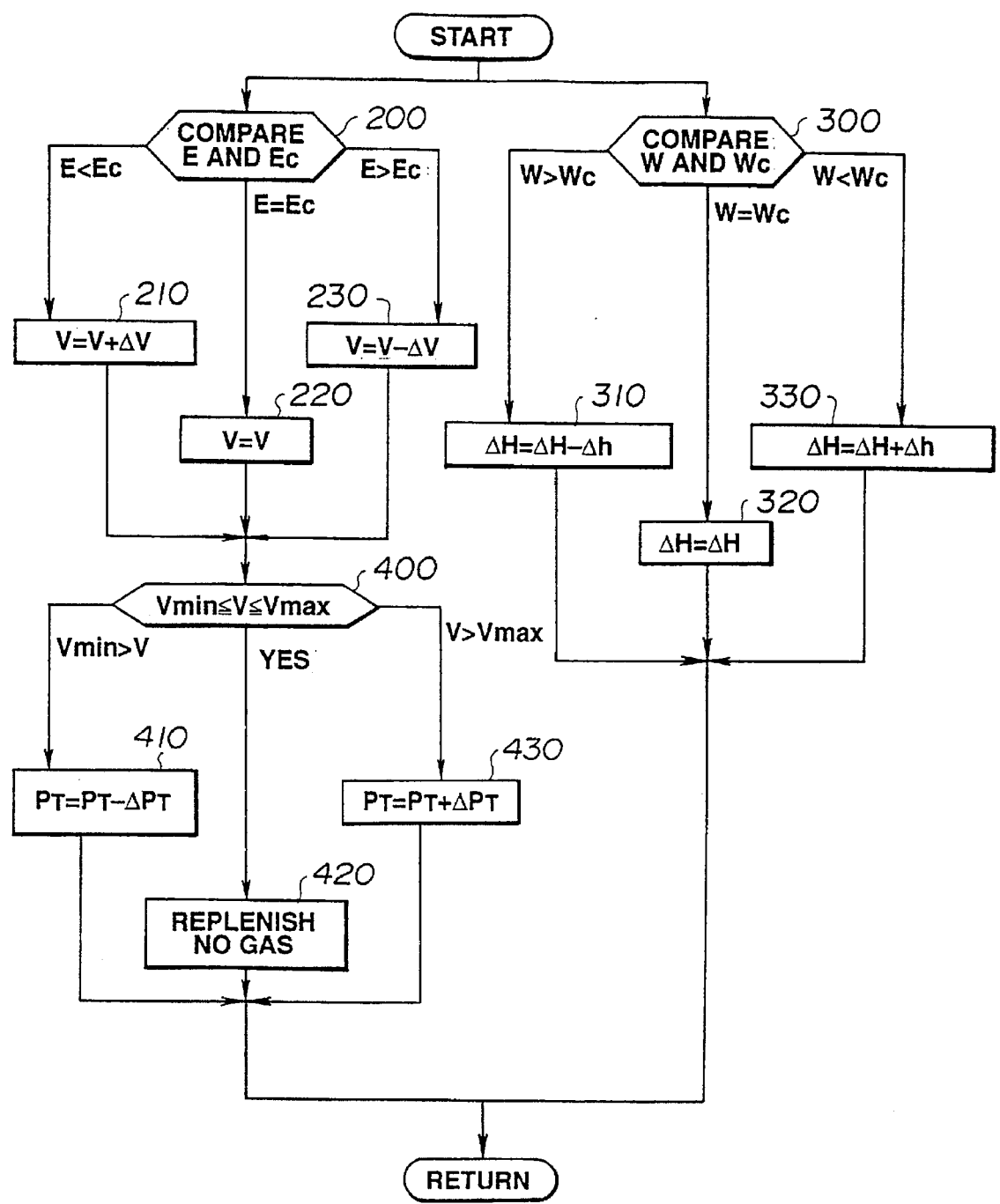
FIG. 15 is a flow chart illustrating a second embodiment of controlling the charging voltage and the supply and exhaust of gases.

Next, a second embodiment of the calculation subroutine is shown in FIG. 15.

The second embodiment is obtained by adding the procedures of steps 400 to 430 to the flow chart of FIG. 13 above.

Specifically, a check is performed (step 400) to determine whether the charging voltage V is between the minimum allowable level $V_{min}$ and the maximum allowable level $V_{max}$ when the procedures of steps 200 to 230 are completed, and the total pressure of the laser gases is lowered by ΔPT (step 410) when V<$V_{min}$, the total pressure of the laser gases is raised by ΔPT (step 430) when V>$V_{max}$, and control procedures aimed at eliminating gas replenishment are performed (step 420) when $V_{min} \leq V \leq V_{max}$. Techniques for raising the total pressure may involve feeding a halogen gas, a buffer gas, a rare gas, both the buffer gas and the rare gas, or the like, whereas the technique for lowering the total pressure involves controlling the exhaust of the laser gases.

The time charts of the various quantities of state controlled as shown in FIG. 15 are shown in FIGS. 16a through 16e.

According to FIGS. 16a through 16e, the charging voltage V is gradually raised by fixedly controlling the laser output, and the gas total pressure PT is raised by ΔPT at times $t_1$, $t_2$, and $t_3$, when the charging voltage V reaches the maximum allowable level $V_{max}$. The increase in the total pressure PT raises the laser output E at times $t_1$, $t_2$, and $t_3$, so the charging voltage V decreases in response.

At time $t_4$ and thereafter, the total pressure PT reaches the maximum value $P_{max}$, and the charging voltage V cannot be raised above this level either, so the laser output E gradually decreases.

In this case as well, the beam width always remains constant because the processing of steps 300 through 330 controls the amount of halogen replenishment so that the beam width W reaches the target value $W_c$. The partial pressure of the halogen gas also reaches a constant level that corresponds to the beam width.

Third Embodiment

Figure 17:
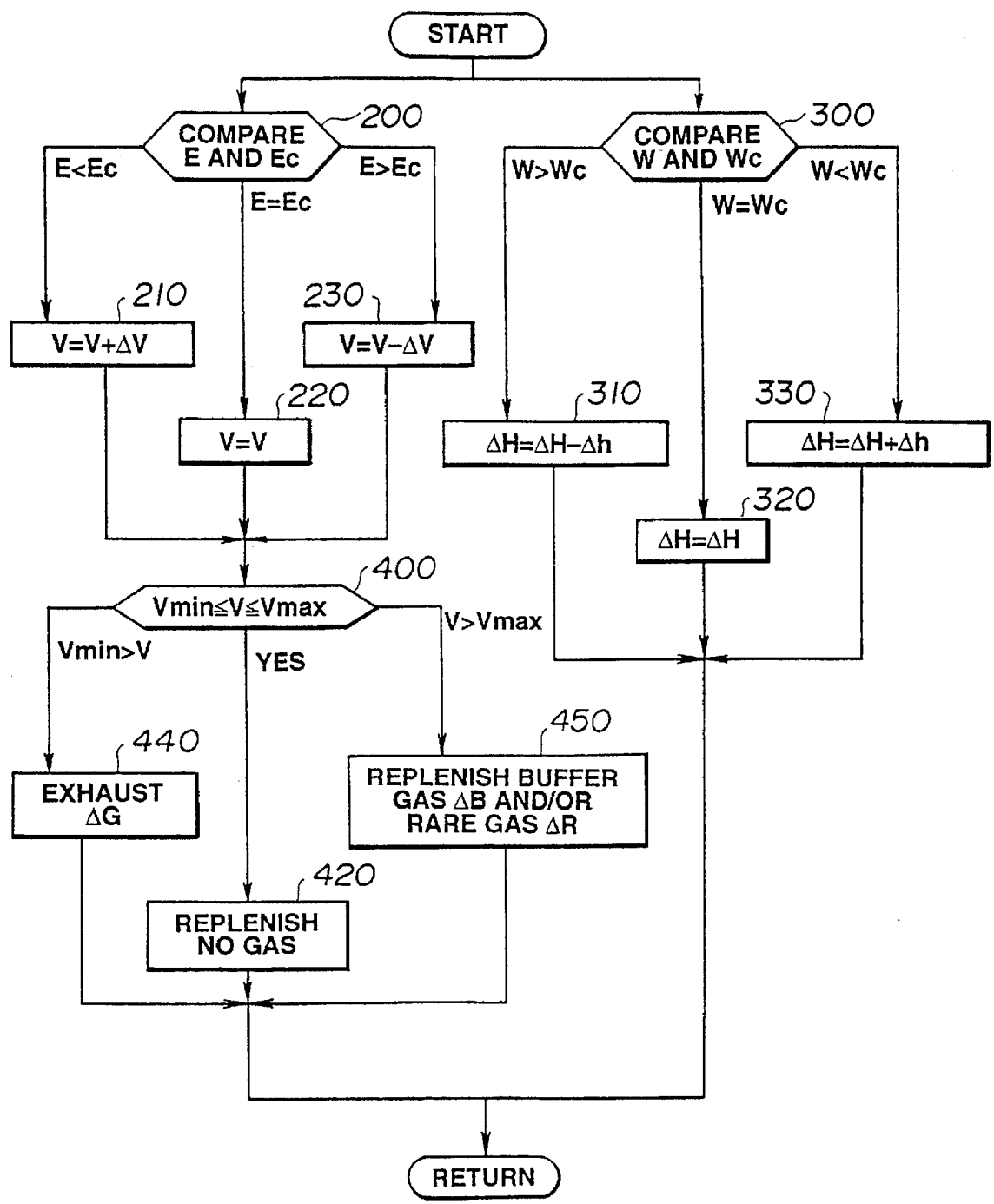
FIG. 17 is a flow chart illustrating a third embodiment of controlling the charging voltage and the supply and exhaust of gases.

Next, a third embodiment of the calculation subroutine is shown in FIG. 17.

The third embodiment is obtained by replacing the steps 410 and 430 shown in FIG. 15 above with steps 440 and 450, respectively.

Specifically, when $V<V_{min}$, $\Delta G$ (a constant value or an amount corresponding to the difference between V and $V_{min}$) is exhausted in order to lower the gas total pressure PT (step 440), and when $V>V_{max}$, a buffer gas, a rare gas, or a mixture of the two gases is replenished in order to raise the gas total pressure PT (step 450). When $V_{min} \leq V \leq V_{max}$, no gas is replenished, Just as described above (step 420).

Fourth Embodiment

Figure 18:
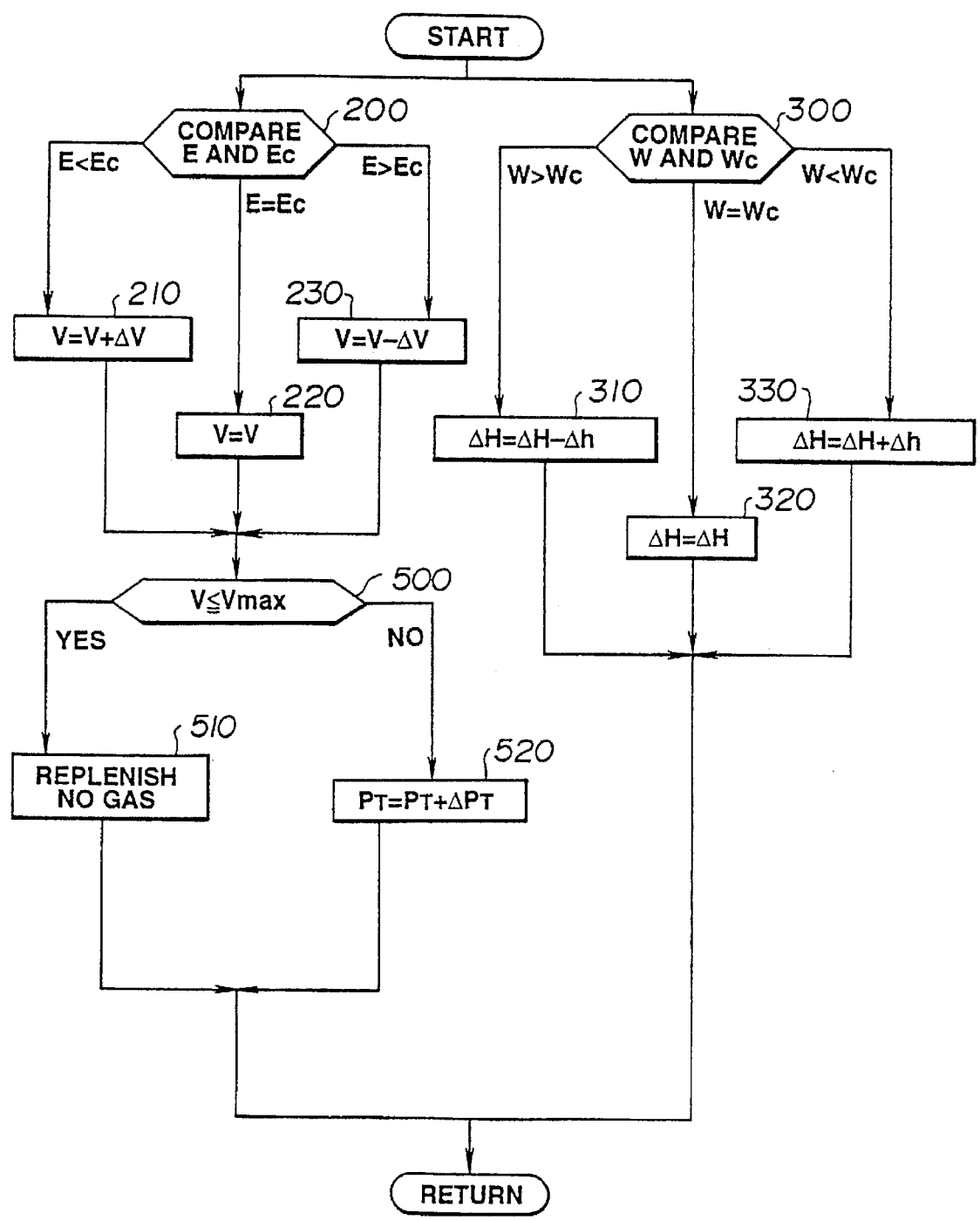
FIG. 18 is a flow chart illustrating a fourth embodiment of controlling the charging voltage and the supply and exhaust of gases.

Next, a fourth embodiment of the calculation subroutine is shown in FIG. 18.

The fourth embodiment is obtained by replacing the steps 400 through 430 shown in FIG. 15 above with steps 500 through 520.

Specifically, the fourth embodiment involves comparing the charging voltage V with the maximum allowable level $V_{max}$ after the procedures of steps 200 through 230 have been completed, and not replenishing the gas if $V \leq V_{max}$, or raising the total pressure PT by $\Delta PT$ if $V>V_{max}$. The fourth and second embodiments are identical to each other; the only difference is that when $V<V_{max}$, the control procedures are designed to exclude the replenishment of gases (fourth embodiment) or to lower the total pressure by $\Delta PT$ (second embodiment). The time charts for the various state signals of the third embodiment are therefore very similar to those described above with reference to the second embodiment.

Fifth Embodiment

Figure 19:
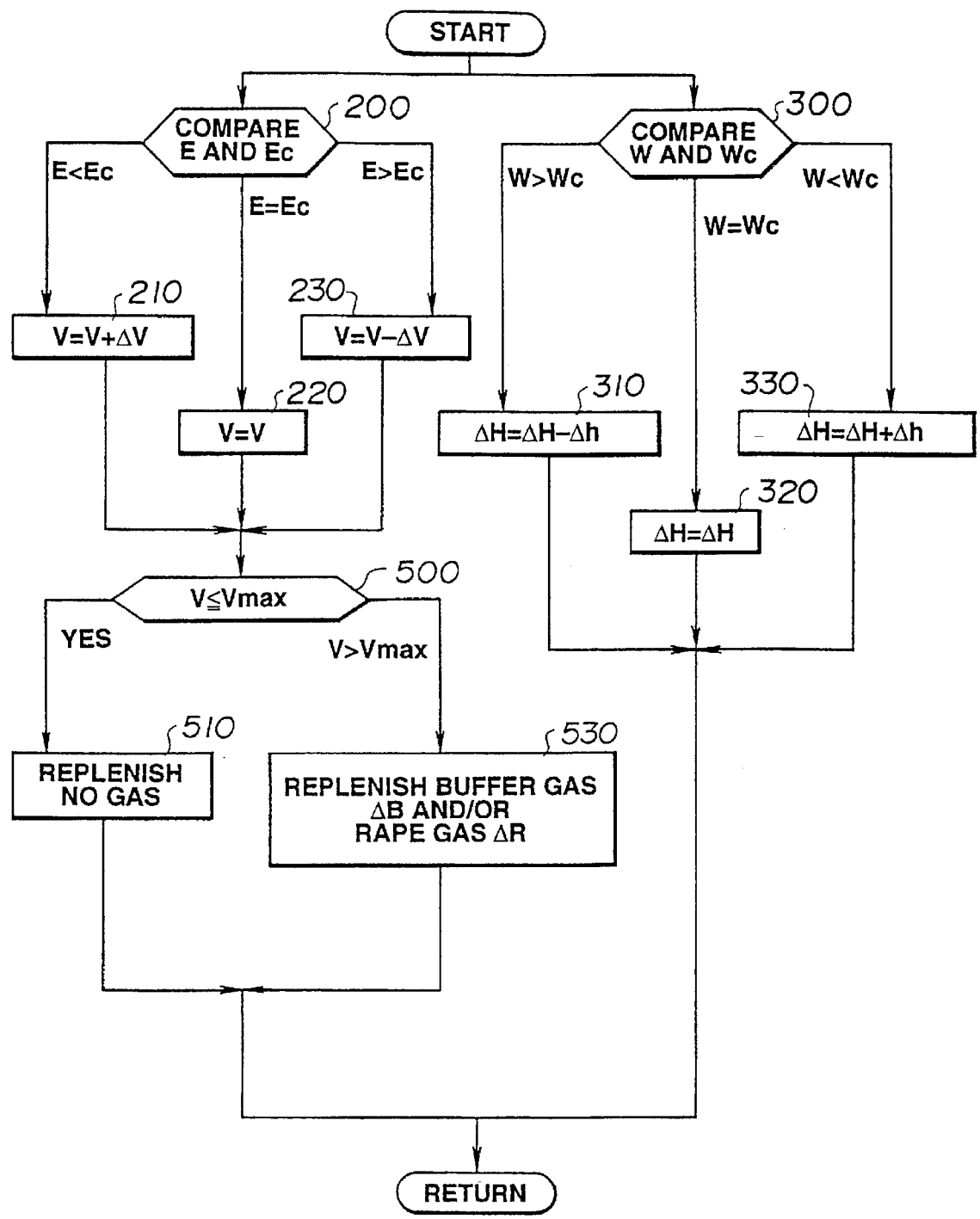
FIG. 19 is a flow chart illustrating a fifth embodiment of controlling the charging voltage and the supply and exhaust of gases.

Next, a fifth embodiment of the calculation subroutine is shown in FIG. 19.

The fifth embodiment is obtained by substituting step 530 for the step 520 shown in FIG. 18 above.

Specifically, the fifth embodiment involves comparing the charging voltage V with the maximum allowable level $V_{max}$ after the procedures of steps 200 through 230 have been completed, and performing no gas replenishment (step 510) if $V \leq V_{max}$, or replenishing the buffer gas, the rare gas, or a mixture of the two gases (step 530) in order to raise the total pressure PT if $V>V_{max}$.

Sixth Embodiment

Figure 20:
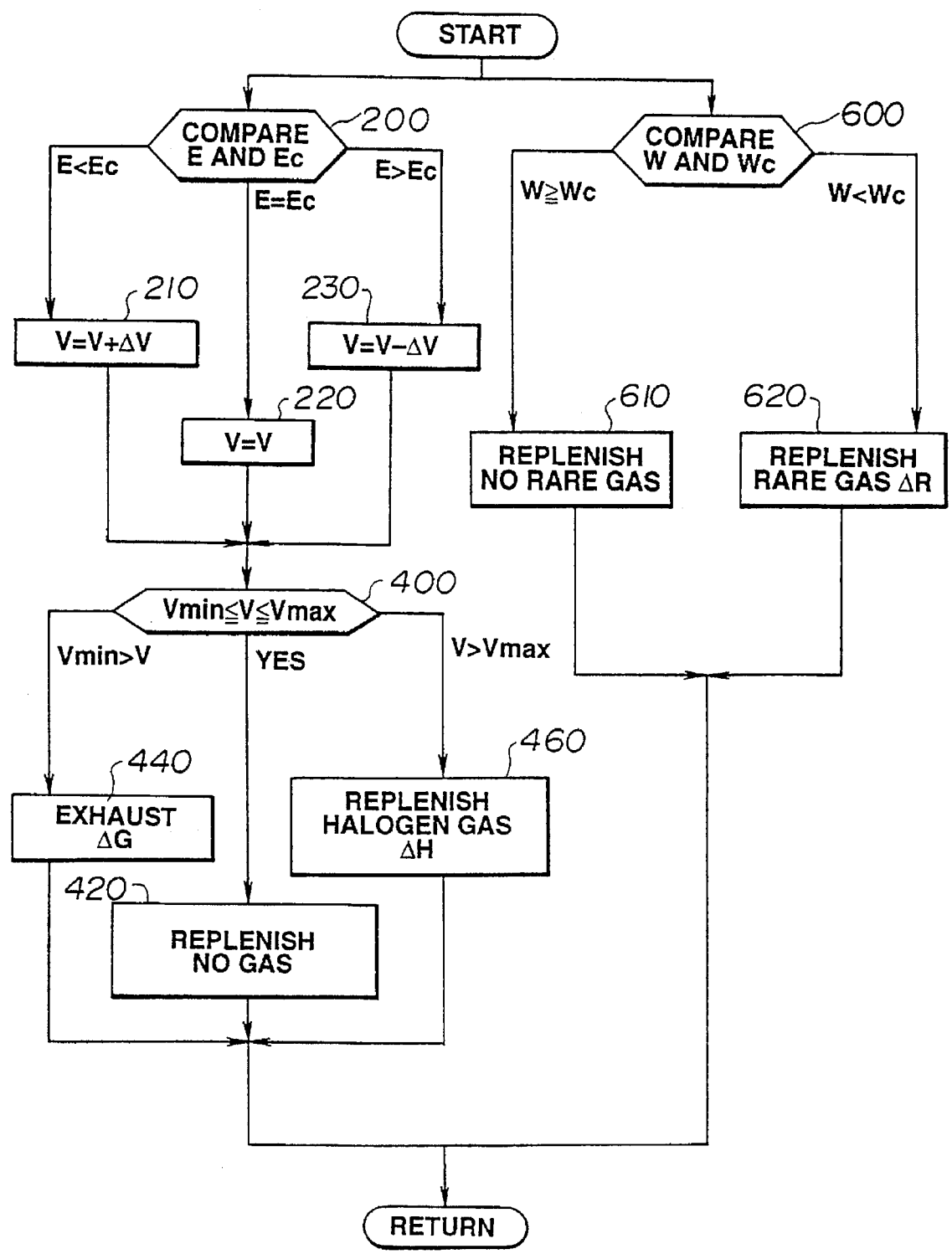
FIG. 20 is a flow chart illustrating a sixth embodiment of controlling the charging voltage and the supply and exhaust of gases.

Next, a sixth embodiment of the calculation subroutine is shown in FIG. 20.

The sixth embodiment is obtained by substituting step 440 for step 410 of the second embodiment shown in FIG. 15, step 460 for step 430, and steps 600 through 620 for steps 300 through 330.

Specifically, the sixth embodiment involves performing a check (step 400) to determine whether or not the charging voltage V is between the minimum allowable level $V_{min}$ and the maximum allowable level $V_{max}$ following the completion of the procedures of steps 200 to 230, performing an exhaust process designed to lower the total pressure of the laser gases (step 440) if $V<V_{min}$, replenishing the halogen gas (step 460) in an amount of $\Delta H$ to raise the total pressure of the laser gases if $V>V_{max}$, and performing control operations (step 420) so that no gas is replenished if $V_{min} \leq V \leq V_{max}$.

Meanwhile, step 600 involves comparing the beam width W with the target value $W_c$, performing control operations (step 610) in such a way that the rare gas is not replenished if $W \geq W_c$, and replenishing the rare gas in an amount of $\Delta R$ (step 620) if $W<W_c$. $\Delta R$ may be a constant amount, or it may be an amount set in accordance with the difference between W and $W_c$.

The sixth embodiment involves taking into account that the beam width W and rare gas partial pressure are in a substantially proportional relation, as shown in FIG. 10, and fixedly controlling the beam width W by controlling the supply of the rare gas.

Seventh Embodiment

Figure 21:
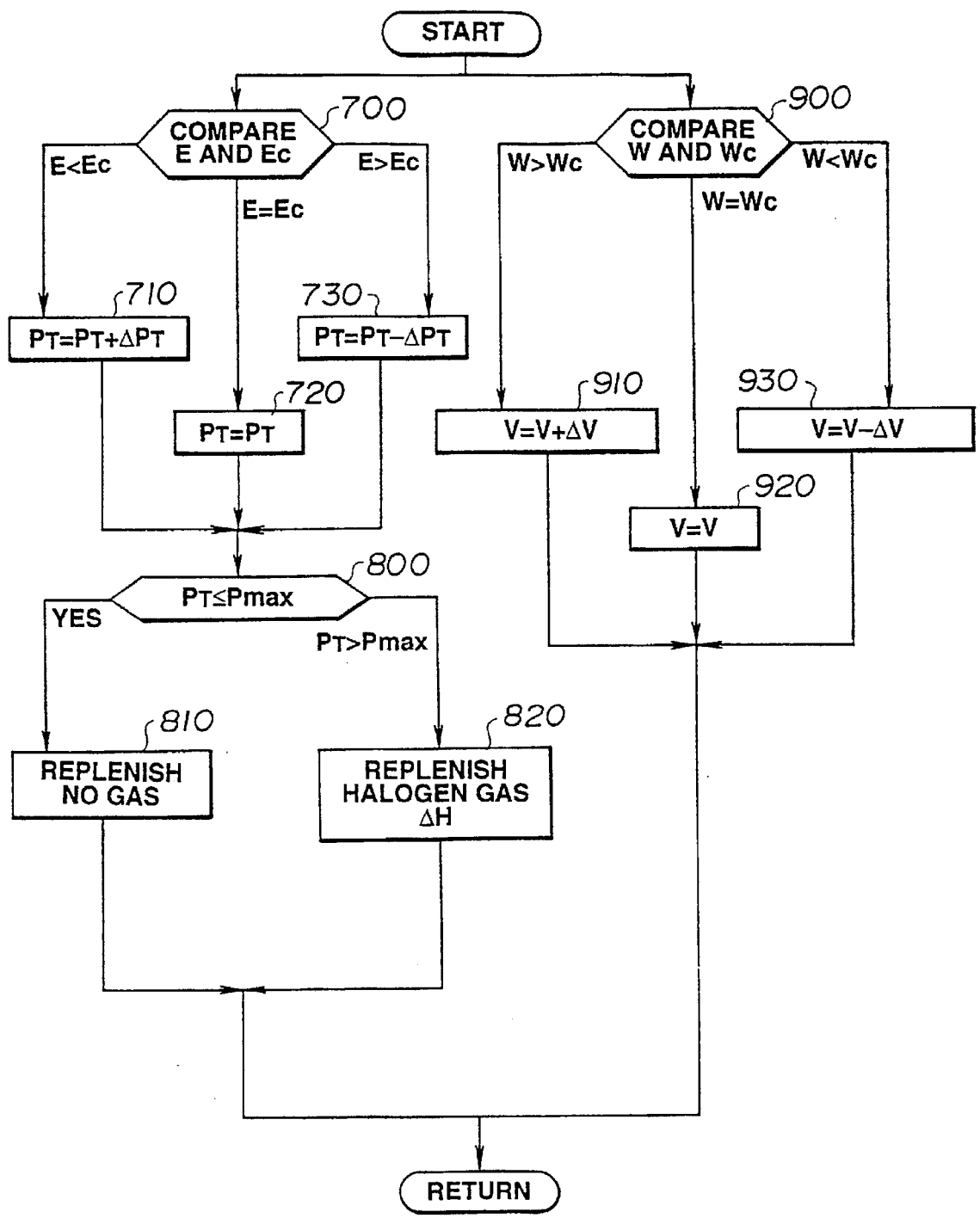
FIG. 21 is a flow chart illustrating a seventh embodiment of controlling the charging voltage and the supply and exhaust of gases.

Next, a seventh embodiment of the calculation subroutine is shown in FIG. 21.

During step 700, the laser output E is compared with a rated laser output $E_c$, the total pressure PT of the laser gases is raised by $\Delta PT$ (step 710) if the result of this comparison is $E<E_c$, the total pressure PT of the laser gases is lowered by $\Delta PT$ (step 730) if $E>E_c$, and the current gas pressure PT is maintained (step 720) if $E=E_c$. $\Delta PT$ may be a constant amount, or it may be an amount set in accordance with the difference between E and $E_c$.

When the procedures are completed, the laser gas pressure PT is compared with the maximum allowable level $P_{max}$, and control operations are performed (step 810) in such a way that the gas is not replenished if $PT \leq P_{max}$, or the halogen gas is replenished in an amount of $\Delta H$ (step 820) if $PT>P_{max}$. $\Delta H$ may be a constant amount, or it may be an amount set in accordance with the difference between PT and $P_{max}$.

Meanwhile, during step 900, the beam width W is compared with the target value $W_c$, the charging voltage V is raised by $\Delta V$ (step 910) if the result of this comparison is $W<W_c$, the charging voltage V is lowered by $\Delta V$ (step 930) if $W>W_c$, and control operations are performed (step 920) in such a way that the current charging voltage V is maintained if $W=W_c$.

The seventh embodiment involves controlling the beam width W by controlling the charging voltage V. As shown in FIG. 6, such control is also possible because the charging voltage V and the beam width W are in a substantially proportional relation.

It is also possible to control the laser output E not with the aid of the charging voltage V but with the aid of the gas pressure PT.

Figure 22:
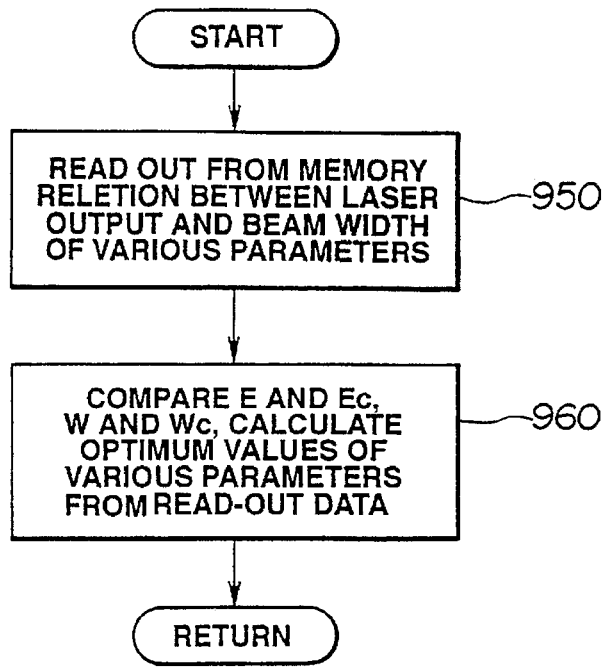
FIG. 22 is a flow chart illustrating a computational method involving the use of a memory table.

The laser output control and beam width control described above can be easily effected by storing in a memory table relations between each parameter and the laser output E or beam width W such as those shown in FIGS. 4 through 11. The operating procedure is shown in FIG. 22.

Specifically, the necessary data are read out from the memory table (step 950), the laser output E and beam width W are compared with $E_c$ and $W_c$, and the optimum parameter values are selected from among the read-out data in accordance with the comparison results (step 960).

These embodiments involve using as the beam profile a beam width W in a direction perpendicular to the discharge direction, but it is also possible to use the beam width in the discharge direction, beam symmetry, or the like. The main point is to use a parameter that allows the beam profile to be shaped as desired. The desired shape may vary with the type of laser or may remain the same irrespective of the type of laser.

In addition, the embodiments involve applying the present invention to a naturally oscillating excimer laser, but it is also possible to apply the present invention to a narrow-band excimer layer with a spectrum made into a narrow band.

Embodiments in which the gas injection circuits and the like are slightly different from those used in the above embodiments will now be described.

Eighth Embodiment

Figure 25:
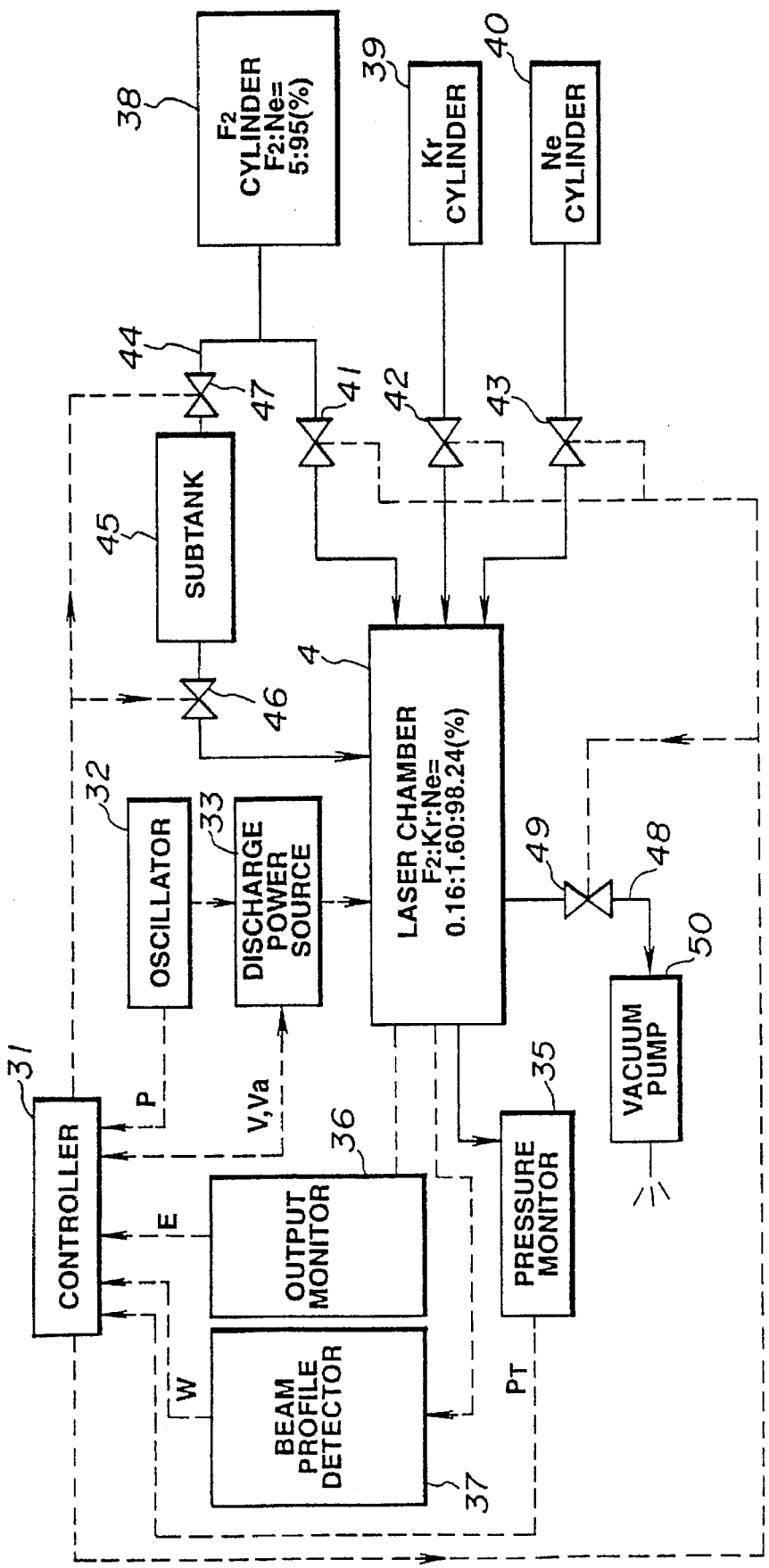
FIG. 25 is a block diagram illustrating a system configuration for performing an eighth embodiment of controlling the charging voltage and the supply and exhaust of gases.
Figure 26:
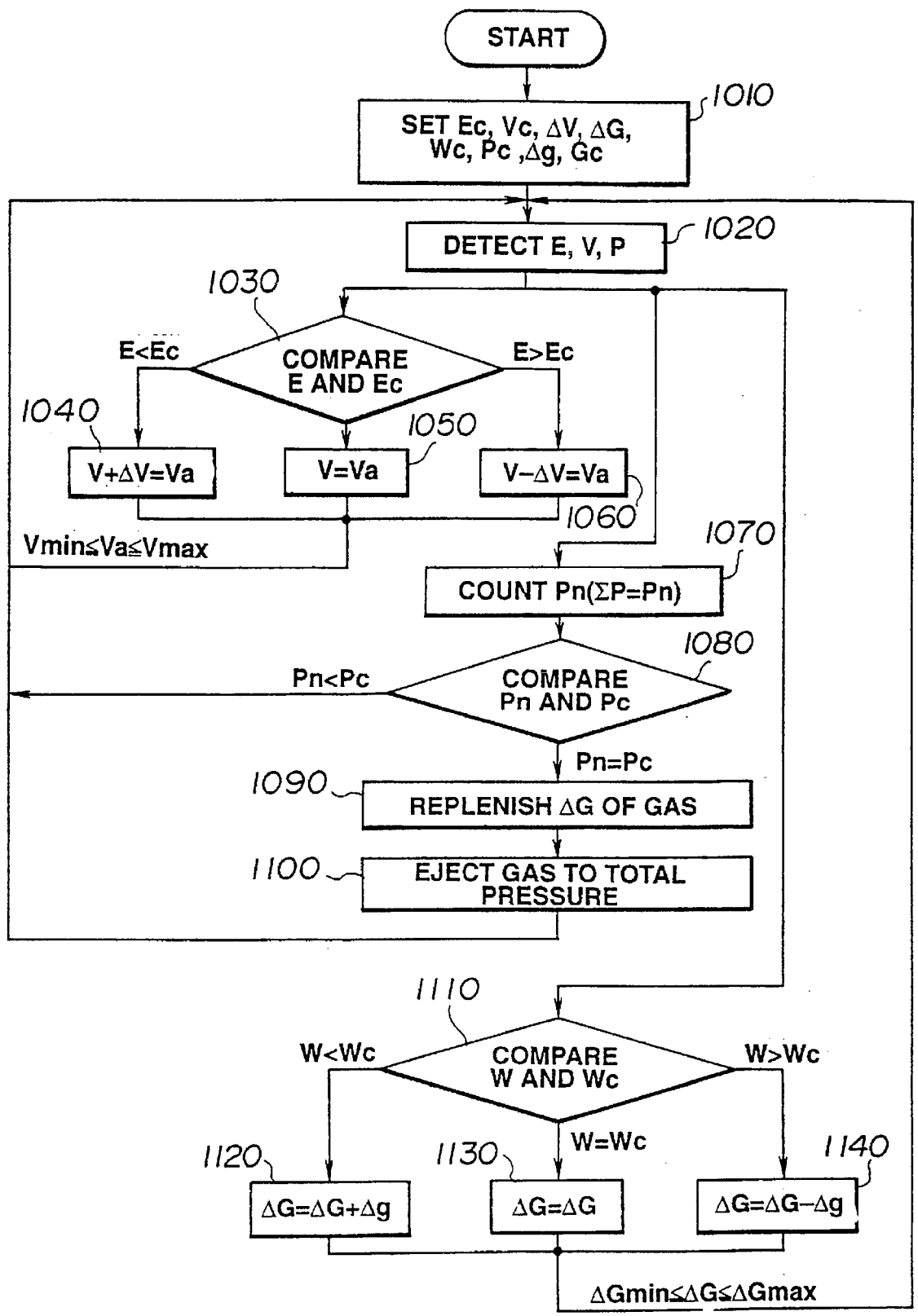
FIG. 26 is a flow chart illustrating a procedure for the eighth embodiment.

FIG. 25 is a block diagram illustrating the configuration of an eighth embodiment, and FIG. 26 is a flow chart illustrating a procedure for the replenishment processing performed by the embodiment device of FIG. 25.

The gas injection circuit of the laser device shown in FIG. 25 will first be described. This gas injection circuit comprises a cylinder 38 filled with $F_2$, HCl, or other such halogen gas diluted with neon, helium, or other such buffer gas; a cylinder 39 filled with krypton, xenon, argon, or other such rare gas; a cylinder 40 filled with neon, helium, or other such buffer gas; and gas injection shutoff valves 41, 42, and 43 installed in the corresponding gas feed lines leading from the cylinders 38 through 40 to the laser chamber 34.

It is assumed that the laser device in FIG. 25 is a so-called fluorine-based excimer laser device in which the cylinder 38 is filled with $F_2$ gas and neon gas in an $F_2$:Ne concentration ratio of 5:95 (%), the cylinder 39 is filled with krypton gas, and the cylinder 40 is filled with neon gas. It is also possible for the cylinders 39 and 40 to be combined into one cylinder filled in advance with a rare gas and buffer gas mixed in a prescribed compositional ratio.

It is assumed that neon gas is used as the buffer gas, but it is of course possible to use helium gas, or to use neon gas and helium gas mixed in an arbitrary mixing ratio to produce the buffer gas.

The gas replenishment circuit of the embodiment device comprises the cylinder 38 and a shutoff valve for replenishing various gases that is installed in a gas feed line 44 leading from this cylinder 38 to the laser chamber 34. To simplify the description of this embodiment device, it is assumed that the gas replenishment shutoff valve comprises a subtank 45 and a downstream shutoff valve 46 and upstream shutoff valve 47 installed in series before and after the subtank 45. In reality, however, various other microflow control valves (not shown) may be installed.

In addition, the gas ejection circuit of the embodiment device comprises a vacuum pump 50, and a laser chamber gas exhaust valve 49 installed in a gas ejection line 48 leading from the laser chamber 34 to the vacuum pump 50.

Data concerning the injection times of various gases, the replenishment time of the halogen gas, the replenishment amount of the halogen gas, and the like are input with the aid of an input means (not shown) and applied to a controller 31.

An oscillator 32 designed to perform pulse generation feeds the oscillation signals from the oscillator 32 to a discharge power source 33. The discharge power source 33 is designed to form an electric discharge between the two electrodes in the laser chamber 34 in accordance with the signals output from the oscillator 32. Charging is first performed in a charging circuit at a voltage corresponding to the command charging voltage $V_a$ received from the controller 31, and electric discharge is then initiated by, for example, the operation of a thyratron or other switching element. The charging voltage V of the discharge power source 33 is detected by a designated sensor and applied to the controller 31.

An electric discharge is initiated in the laser chamber 34, the excitation of the laser gases triggers laser generation, and the generated laser light is caused to resonate in an optical resonator and is output as effective generated laser light from the front mirror. The electric discharge occurs at prescribed intervals characterized by a prescribed pulse width, and laser light is output intermittently.

The laser light thus generated strikes an output monitor 36, which detects the energy E of the output laser light (hereinafter "the laser output E"). The laser output E is applied to the controller 31.

A beam profile detector 37 (which is similar to the beam profile detector 20 in that the laser light strikes a line sensor) detects the beam width W and feeds the result to the controller 31.

A pressure monitor 35 is a sensor for detecting the pressure (total pressure) PT of the gas inside the laser chamber 34; the detected pressure PT is fed to the controller 31. A signal P indicating that a single pulse has been generated is fed to the controller 31 every time a generated signal has been output by the oscillator 32.

The controller 31 calculates the command charging voltage $V_a$ on the basis of the output from the monitors for 32, 33, 36, and 37 in a manner such as that described below, and outputs the results to the discharge power source 33 to control the discharge voltage; the opening and closing of the valves 44, 46, and 49 is controlled in such a way that the pressure inside the laser chamber 34 is kept at a prescribed constant level when gases are ejected from the laser chamber 34 during the replenishment of the halogen gas in a manner such as that described below on the basis of the output of the pressure monitor 35. In addition, the controller 31 controls the valves 41, 42, and 43 as needed to obtain a prescribed ratio of the gas composition in the laser chamber 34 when the gases are replaced before the laser is operated, that is, when the various laser gases are injected into the laser chamber 34 from the cylinders 38, 39, and 40.

The gases are injected by the following procedure.

Specifically, the old gases are first ejected from the laser chamber 34 by the gas ejection circuit before the start of laser operation.

Krypton gas is then introduced at 40 torr from the cylinder 39 to the laser chamber 34, $F_2$ gas (diluted with neon gas in a manner such as that described above) is subsequently introduced at 80 torr from the cylinder 38 into the laser chamber 34, and neon gas is finally introduced from the cylinder 40 into the laser chamber 34 in such a way that the total pressure inside the laser chamber 34 reaches 2500 torr. In this embodiment device, the composition of the gases in the laser chamber 34 corresponds to an $F_2$:Kr:Ne ratio of 4:40:2456 (torr), that is, to an $F_2$:Kr:Ne concentration ratio of 0.16:1.60:98.24 (%). When the gases are introduced into the laser chamber 34 from the cylinders 38, 39, and 40, the controller 31 controls the opening and closing of the shutoff valves 41, 42, and 43 on the basis of the output from the pressure monitor 35 in such a way that the pressure inside the chamber 34 reaches the prescribed pressure of 2500 torr.

As described above, when an excimer laser device is operated continuously, the halogen gas is consumed in the course of the operation, and the laser output decreases. Because this laser output is obtained by feeding electric energy (with which a capacitor is charged in order to excite the laser) to a discharge space and activating a laser medium gas, the laser output can be changed by controlling the charging voltage $V_a$ applied to the capacitor. Specifically, even when the halogen gas is consumed, the laser output can be kept constant by raising the charging voltage $V_a$ going to the capacitor by an amount corresponding to the consumption-induced reduction in output.

In view of the above, this embodiment involves presetting a control charging voltage range $V_c$ ($V_{min}$ to $V_{max}$) deemed optimum for the charging voltage $V_a$, and outputting an alarm signal indicating the need for gas replacement when the charging voltage $V_a$ exceeds this range, that is, when the condition $V_a > V_{max}$ results.

The gas replenishment period or replenishment amount is determined based on the data that have been input from the input means in a manner such as described above. The gas is replenished by the gas replenishment circuit, and every time the gas is replenished, the gas is partially ejected from the laser chamber 34 by the gas ejection circuit in such a way that the total pressure inside the laser chamber 34 is kept at a predetermined level.

FIG. 26 illustrates the procedure for such replenishment processing. Based on the input data, the following parameters are preset (step 1010): the target laser output $E_c$, optimum control charging voltage range $V_c$ ($V_{min}$ to $V_{max}$), command charging voltage increment $\Delta v$ (absolute value), single-cycle replenishment gas amount $\Delta G$ (initial value), target beam width $W_c$, pulse-number threshold $P_c$, optimum control gas replenishment amount range $\Delta G_c$ ($\Delta G_{min}$ to $\Delta G_{max}$), and replenishment gas increment $\Delta g$ (absolute value). With manual control, these set values $E_c$, $V_c$, $\Delta v$, $\Delta G$, $W_c$, $\Delta P_c$, and $\Delta G_c$ should be set at least before the required time, and there is no need for the settings to be made at the outset in a manner such as that described above. When complete control is effected using a microcomputer, however, these set values must be set and stored at the outset as described above.

Detection values E, V, P, and W are subsequently input from the output monitor 35, discharge power source 33, oscillator 32, and beam profile detector 37 (step 1020).

The detected laser output E and the target laser output $E_c$ are then compared with each other (step 1030), and if the result of this comparison is $E<E_c$, an increment $\Delta v$ is added to the detected charging voltage V, and the result of addition is output as the command charging voltage $V_a$ to the discharge power source 33 (step 1040) in such a way that the subsequently detected laser output E rises to the level of the target laser output $E_c$. If the comparison result is $E=E_d$, the detected charging voltage V is directly output as the command charging voltage $V_a$ to the discharge power source 33 (step 1050). If the comparison result is $E>E_c$, an increment $\Delta v$ is subtracted from the detected charging voltage V, and the result of subtraction is output as the command charging voltage $V_a$ to the discharge power source 33 (step 1060) in such a way that the subsequently detected laser output E decreases to the level of the target laser output $E_c$.

At this stage, the command charging voltage $V_a$ and the maximum value $V_{max}$ of the optimum control charging voltage range $V_c$ are compared with each other. If the result is within a suitable range and the condition $V_a \leq V_{max}$ is satisfied, the operation returns to step 1020, and the same processing is performed, and if $V_a > V_{max}$, there is a warning that the command voltage is outside the allowed range, an alarm signal indicating a need for gas replacement is output, and a warning is relayed to the operator.

During step 1070, meanwhile, pulse generation P is detected (step 1070) by counting the cumulative pulse number $P_n$ generated from the point new gases were injected into the laser chamber 34 until the present moment, and the cumulative amount $P_n$ is compared with the threshold $P_c$ (step 1080). If the result of this comparison is that the cumulative pulse number $P_n$ does not exceed the threshold $P_c$, it is determined that no deleterious effect will be produced at all even when no direct gas replenishment is made, and the operation returns to step 1020. At the point when the cumulative pulse number $P_n$ reaches the threshold $P_c$, however, the gas is replenished using a replenishment amount $\Delta G$ corresponding to the threshold $P_c$.

The gas is replenished in the following manner.

Specifically, the valve 46 is closed, and the valve 47 is opened to fill the constant-capacity subtank 45 with a diluted halogen gas. Following filling, the valve 46 is opened and the valve 47 is closed to eject the halogen gas from the subtank 45 and to feed the gas to the laser chamber 34. A prescribed amount $\Delta G$ of the gas is replenished (step 1090) by repeating these operations a prescribed number of times. During replenishment, the total pressure inside the laser chamber 34 rises with replenishment, but the total pressure PT is detected by the pressure monitor 35, and the opening and closing of the valve 49 is controlled (step 1100) in such a way that the pressure inside the laser chamber 34 is brought to the prescribed level on the basis of the detection value PT.

In this case, the replenishment amount $\Delta G$ of the gas is not necessarily limited to the initial value that is set during step 1010, and may be varied in accordance with the beam width W.

Specifically, the detected beam width W and the target beam width $W_c$ are compared with each other (step 1110), and if the result is $W<W_c$, a prescribed increment $\Delta g$ (absolute value) is added to the replenishment amount $\Delta G$ so that the subsequently detected beam width W widens to the target beam width $W_c$, and the amount obtained by adding $\Delta g$ to the replenishment amount $\Delta G$ is fed to the laser chamber 34 (step 1120). If the comparison result is $W>W_c$, the increment $\Delta g$ is subtracted from the replenishment amount $\Delta G$ so that the subsequently detected beam width W narrows to the target beam width $W_c$, and the amount obtained by subtracting $\Delta g$ from the replenishment amount $\Delta G$ is replenished into the laser chamber 34 (step 1140). If the comparison result is $W=W_c$, the gas is replenished into the laser chamber 34 without increasing or reducing the current replenishment amount $\Delta G$ (step 1130).

When the gas replenishment amount $\Delta G$ is increased or reduced in such a manner, the number of filling and emptying operations involving the subtank 45 described above is changed accordingly, and an increased or reduced replenishment amount $\Delta G$ of the gas is fed to the laser chamber 34 by performing the changed number of filling and emptying operations.

In this case, a controllable range is set as the optimum control gas replenishment amount range ($\Delta G_{min}$ to $\Delta G_{max}$) for the replenishment amount $\Delta G$ as well, and it is determined whether or not the current replenishment amount $\Delta G$ falls within this range. If it is learned as a result that the replenishment amount $\Delta G$ is within the range, it is assumed that the prescribed type of processing involving laser light (exposure processing or the like) does not present problems in terms of accuracy, and the operation returns to step 1020, and if the replenishment amount $\Delta G$ falls outside the range, this means that there has been a reduction in the uniformity of light travelling through the illumination system of the exposure device, so an alarm signal to that effect is output to an outside control device (exposure device). As a result, processing with laser light is stopped or other prescribed measures are undertaken.

Ninth Embodiment

Figure 27:
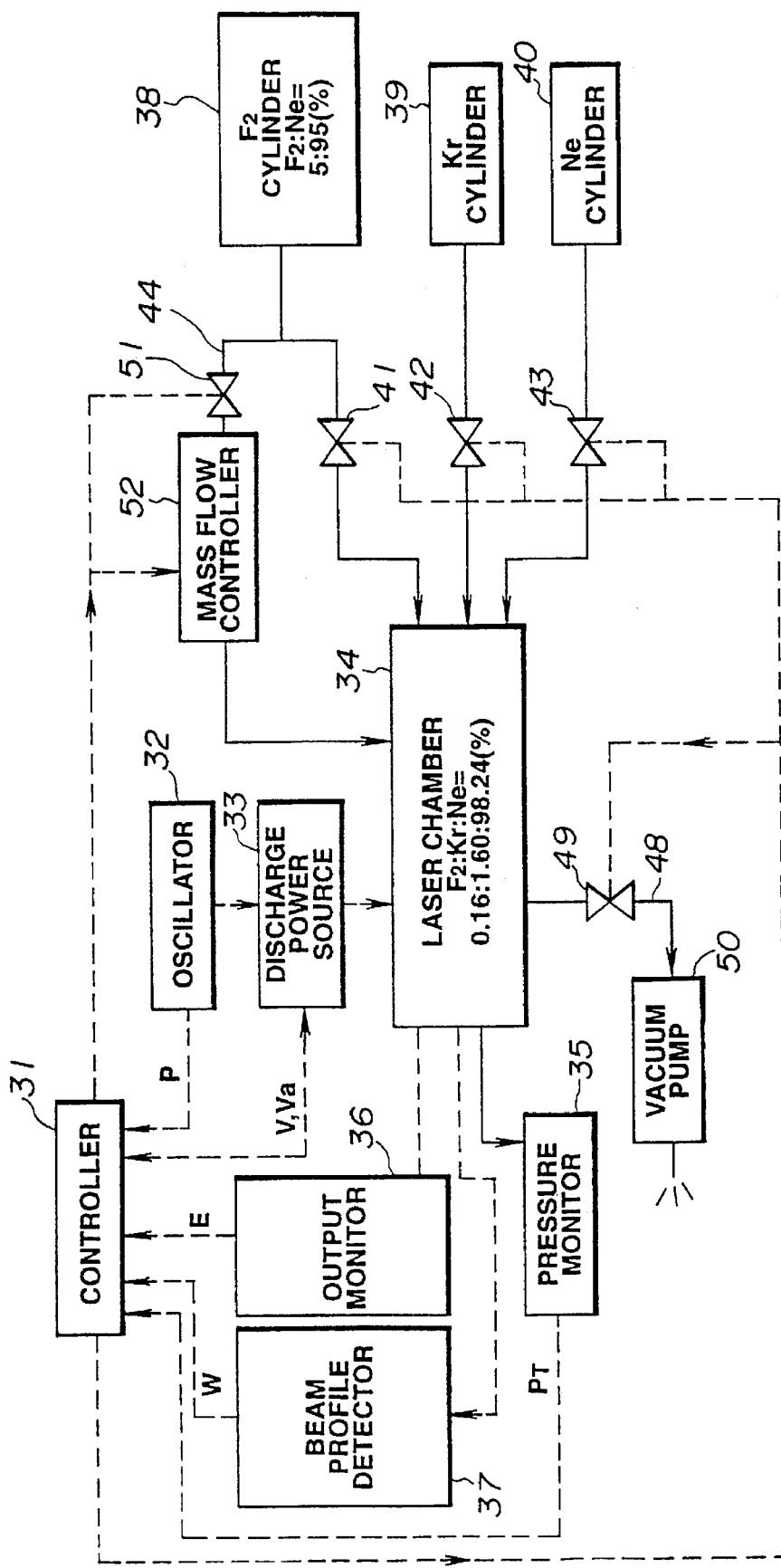
FIG. 27 is a block diagram illustrating a system configuration for performing a ninth embodiment of controlling the charging voltage and the supply and exhaust of gases.

Ninth embodiment will now be described with reference to FIGS. 27 and 28, which are similar to FIGS. 25 and 26. In FIG. 27, identical symbols are used for components with the same functions as those in FIG. 25. This embodiment device involves installing a shutoff valve 51 and a mass flow controller (mass flow controlling device) 52 in the gas replenishment line 44. This mass controller 52 controls the amount of gas passing through the gas replenishment line 44 so that the mass flow is kept at the desired constant level.

Figure 28:
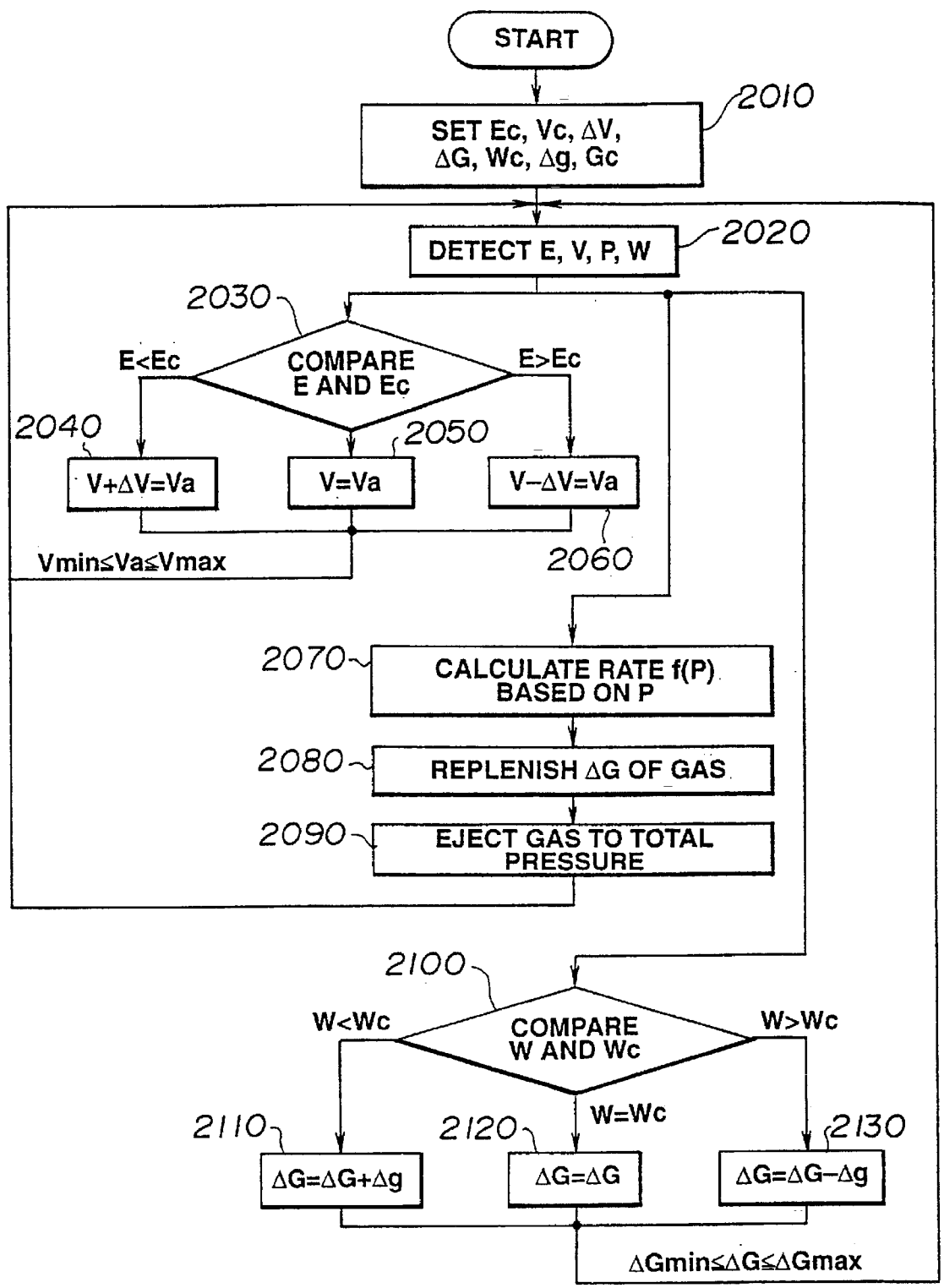
FIG. 28 is a flow chart illustrating a procedure for the ninth embodiment.

FIG. 28 illustrates a procedure for the gas replenishment processing performed by the device of FIG. 27. As in the eighth embodiment described above, the following parameters are preset based on the input data (step 2010): the target laser output $E_c$, optimum control charging voltage range $V_c$ ($V_{min}$ to $V_{max}$), command charging voltage increment $\Delta v$ (absolute value), single-cycle replenishment gas amount $\Delta G$ (initial value), target beam width $W_c$, replenishment gas increment $\Delta g$ (absolute value), and optimum control gas replenishment amount range $\Delta G_c$ ($\Delta G_{min}$ to $\Delta G_{max}$).

Detection values E, V, P, and W are subsequently input from the output monitor 35, discharge power source 33, oscillator 32, and beam profile detector 37 (step 2020).

The detected laser output E and the target laser output $E_c$ are then compared with each other (step 2030), and if the result of this comparison is $E<E_c$, an increment v is added to the detected charging voltage V, and the result of addition is output as the command charging voltage $V_a$ to the discharge power source 33 (step 2040) in such a way that the subsequently detected laser output E rises to the level of the target laser output $E_c$. If the comparison result is $E=E_c$, the detected charging voltage V is directly output as the command charging voltage $V_a$ to the discharge power source 33 (step 2050). If the comparison result is $E>E_c$, an increment $\Delta v$ is subtracted from the detected charging voltage V, and the result of subtraction is output as the command charging voltage $V_a$ to the discharge power source 33 (step 2060) in such a way that the subsequently detected laser output E decreases to the level of the target laser output $E_c$.

At this stage, the command charging voltage $V_a$ and the maximum value $V_{max}$ of the optimum control charging voltage range $V_c$ are compared with each other. If the result is within a suitable range and the condition $V_1 \leq V_{max}$ is satisfied, the operation returns to step 2020, and similar processing is performed. When $V_a > V_{max}$, the command voltage falls outside the allowed range, an alarm signal indicating a need for gas replacement is output, and a warning is relayed to the operator.

The ninth embodiment involves replenishing the diluted halogen gas using a mass flow controller 52 for replenishing the gas at a rate proportional to the number of generated pulses per unit of time, that is, to the pulse generation rate f(P).

Specifically, the pulse generation rate f(P) developed during the current generation operation is calculated based on pulse generation P (step 2070), and halogen gas is replenished into the laser chamber 34 in a replenishment amount $\Delta G$ that is proportional to the rate f(P).

The gas is replenished in the following manner.

Specifically, the valve 51 is opened, and the flow rate is controlled by the mass flow controller 52 in such a way that the rate of flow through the gas replenishment line 44 is fixed at a level corresponding to the rate f(P). The valve 51 therefore remains open for a constant time, and a prescribed amount $\Delta G$ of the gas is replenished into the laser chamber 34 by performing gas replenishment at this flow rate.

It is also possible to fix at a constant level the flow rate controlled by the mass flow controller 52 and to force the valve 51 to remain in an open state for a time that corresponds to the rate f(P). In this case as well, a prescribed amount $\Delta G$ of gas is replenished into the laser chamber 34 in accordance with the time during which the valve 51 remains open and with the flow rate controlled by the mass flow controller 52 (step 2080). During replenishment, the total pressure inside the laser chamber 34 rises with replenishment, but the opening and closing of the valve 49 is controlled (step 2090) in such a way that the total pressure PT is detected by the pressure monitor 35, and the pressure inside the laser chamber 34 is brought to the prescribed level on the basis of the detection value PT.

In this case, the replenishment amount $\Delta G$ of the gas is not necessarily limited to the initial value that is set during step 2010, and may be varied in accordance with the beam width W measured by the beam profile detector 37.

Specifically, the detected beam width W and the target beam width $W_c$ are compared with each other (step 2100), and if the result is $W<W_c$, a prescribed increment $\Delta g$ (absolute value) is added to the replenishment amount $\Delta G$ so that the subsequently detected beam width W widens to the target beam width $W_c$, and the amount obtained by adding $\Delta g$ to the replenishment amount $\Delta G$ is fed to the laser chamber 34 (step 2110). If the comparison result is $W>W_c$, the increment $\Delta g$ is subtracted from the replenishment amount $\Delta G$ so that the subsequently detected beam width W narrows to the target beam width $W_c$, and the amount obtained by subtracting $\Delta g$ from the replenishment amount $\Delta G$ is replenished into the laser chamber 34 (step 2130). If the comparison result is $W=W_c$, the gas is replenished into the laser chamber 34 without increasing or reducing the current replenishment amount $\Delta G$ (step 2120).

In this case, a controllable range is set as the optimum control gas replenishment amount range ($\Delta G_{min}$ to $\Delta G_{max}$) for the replenishment amount $\Delta G$ as well, and it is determined whether or not the current replenishment amount $\Delta G$ falls within this range. If it is learned as a result that the replenishment amount $\Delta G$ is within the range, it is assumed that the prescribed type of processing involving laser light (exposure processing or the like) does not present problems in terms of accuracy, and the operation returns to step 2020, but if the replenishment amount $\Delta G$ falls outside the range, this means that there has been a reduction in the uniformity of light travelling through the illumination system of the exposure device, so an alarm signal to that effect is output to an outside control device (exposure device). As a result, processing with laser light is stopped or other prescribed measures are undertaken.

What is claimed is:

1. An excimer laser device comprising:
   a laser chamber containing a laser gas which is excited by initiating an electric discharge in the laser chamber to output laser light;
   beam width detection means for detecting a beam width of the output laser light and outputting a beam width signal; and
   discharge voltage control means for controlling the beam width by adjusting a voltage of the electric discharge in accordance with a difference between an amplitude of the beam width signal output from the beam width detection means and a target beam width signal.

2. An excimer laser device as defined in claim 1, wherein the beam width detection means detects the beam width of the laser light in a direction substantially perpendicular to that of the electric discharge.

3. An excimer laser device comprising:
   a laser chamber containing laser gases, which are excited by initiating an electric discharge in the laser chamber to output laser light:
   beam width detection means for detecting a beam width of the output laser light and outputting a beam width signal; and
   gas control means for controlling the beam width by adjusting a composition or total pressure of the laser gases in accordance with a difference between an amplitude of the beam width signal output from the beam width detection means and a target beam width signal.

4. An excimer laser device as defined in claim 3, wherein the beam width detection means detects the beam width of the laser light in a direction substantially perpendicular to that of the electric discharge.

5. An excimer laser device comprising:
 a laser chamber containing laser gases, which are excited by initiating an electric discharge in the laser chamber to output laser light;
 beam width detection means for detecting a beam width of the output laser light and outputting a beam width signal; and
 control means for controlling the beam width by adjusting a voltage of the electric discharge and composition or total pressure of the laser gases accordance with a difference between an amplitude of the beam width signal output from the beam width detection means and a target beam width signal.

6. An excimer laser device as defined in claim 5, wherein the beam width detection means detects the beam width of the laser light in a direction substantially perpendicular to that of the electric discharge.

7. An excimer laser device comprising:
 a laser chamber containing laser gases including a halogen gas which are excited by initiating an electric discharge in the laser chamber to output laser light;
 beam width detection means for detecting a beam width of the output laser light and outputting a beam width signal; and
 halogen gas supply means for controlling the beam width by adjusting a feed rate of the halogen gas in accordance with a difference between an amplitude of the beam width signal output from the beam width detection means and a target beam width signal.

8. An excimer laser device as defined in claim 7, wherein the beam width detection means detects the beam width of the laser light in a direction substantially perpendicular to that of the electric discharge.

9. An excimer laser device as defined in claim 7,
 wherein the width profile detection means detects the beam width of the laser light in a direction substantially perpendicular to that of the electric discharge, and
 wherein the halogen gas supply means counts a number of pulses generated after a fresh laser gas has been sealed in the laser chamber as a result of gas replacement, feeds the halogen gas in an amount corresponding to the counted number of generated pulses, and increases the halogen gas feed rate if the beam width signal is smaller than a predetermined amount, and lowers the halogen feed rate if the beam width signal exceeds the predetermined amount.

10. An excimer laser device as defined in claim 9, wherein a tank of constant capacity is installed in a gas feed line between the laser chamber and a halogen gas supply source,
 wherein the halogen gas supply means performs a number of processing cycles in which the tank is filled with a a known amount of the gas from the halogen gas supply source and the halogen gas is then fed from the tank to the laser chamber via the gas feed line, a predetermined number of the processing cycles establishing an initial feed rate of the halogen gas, and
 wherein the feed rate of the halogen gas is changed from the initial feed rate by varying the number of processing cycles to a number other than the predetermined number.

11. An excimer laser device as defined in claim 7, where a tank of constant capacity is installed in a gas feed line between the laser chamber and a halogen gas supply source,
 wherein the halogen gas supply means performs a number of processing cycles in which the tank is filled with a known amount of the halogen gas from the halogen gas supply source and the halogen gas is then fed from the tank to the laser chamber via the gas feed line, a predetermined number of the processing cycles establishing an initial feed rate of the halogen gas, and
 wherein the feed rate of the halogen gas is changed from the initial feed rate by varying the number of processing cycles to a number other than the predetermined number.

12. An excimer laser device as defined in claim 7, wherein the halogen gas supply means calculates a number of oscillations of the laser light per unit of time and varies a replenishment amount of halogen gas in proportion to the calculated number of oscillations per unit of time.

13. An excimer laser device as defined in claim 12, wherein a constant flow control valve and a feed line shutoff valve are installed in a gas feed line arranged between the laser chamber and a halogen gas supply source, and the halogen gas supply means varies a replenishment amount of halogen gas by changing a time during which the shutoff valve remain closed.

14. An excimer laser device as defined in claim 12, where a constant flow control valve and a feed line shutoff valve are installed in a gas feed line arranged between the laser chamber and a halogen gas supply source, and the halogen gas supply means varies the replenishment amount by opening the shutoff valve for a predetermined amount of time and changing a value of a constant flow rate controlled by the constant flow control valve in accordance with the calculated number of oscillations.

15. An excimer laser device as defined in claim 7, where a constant flow control valve and a feed line shutoff valve are installed in a gas feed line arranged between the laser chamber and a halogen gas supply source, and the halogen gas supply means varies a replenishment amount of halogen gas by changing a time during which the shutoff valve remains closed.

16. An excimer laser device comprising:
 a laser chamber containing laser gases including a rare earth gas, which are excited by initiating an electric discharge in the laser chamber to output laser light; and
 beam width detection means for detecting a beam width of the output laser light and outputting a beam width signal; and
 rare gas supply means for controlling the beam width by adjusting a feed rate of the rare gas in accordance with a difference between an amplitude of the beam width signal output from the beam width detection means and a target beam width signal.

17. An excimer laser device as defined in claim 16, wherein the beam width detection means detects the beam width of the laser light in a direction substantially perpendicular to that of the electric discharge.

18. An excimer laser device as defined in claim 16, wherein a tank of constant capacity is installed in a gas feed line between the laser chamber and a rare gas supply source,
 wherein the rare gas supply means performs a number of processing cycles in which the tank is filled with a a known amount of the gas from the rare gas supply source and the rare gas is then fed from the tank to the laser chamber via the gas feed line, a predetermined number of the processing cycles establishing an initial feed rate of the rare gas, and wherein the feed rate of the rare gas is changed from the initial feed rate by varying the number of processing cycles to a number other than the predetermined number.

19. An excimer laser device comprising:

a laser chamber containing laser gases which are excited by initiating an electric discharge in the laser chamber to output laser light;

power detection means for detecting power of the output laser light and outputting a power signal;

beam width detection means for detecting a beam width of the output laser light and outputting a beam width signal;

discharge voltage control means for controlling the power of the laser light by adjusting a voltage of the electric discharge in accordance with a difference between an amplitude of the power signal output from the power detection means and a target power signal;

gas control means for controlling the beam width by adjusting a composition or total pressure of the laser gases in accordance with a difference between an amplitude of the beam width signal output from the beam width detection means and a target beam width signal.

\* \* \* \* \*